(12) United States Patent
Kobayashi et al.

(10) Patent No.: US 10,974,199 B2
(45) Date of Patent: *Apr. 13, 2021

(54) HOLLOW FIBER MEMBRANE MODULE

(71) Applicant: TORAY INDUSTRIES, INC., Tokyo (JP)

(72) Inventors: Atsushi Kobayashi, Shiga (JP); Kenta Iwai, Shiga (JP); Masayuki Hanakawa, Shiga (JP); Tamotsu Kitade, Shiga (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 16/305,540

(22) PCT Filed: May 30, 2017

(86) PCT No.: PCT/JP2017/020156
§ 371 (c)(1),
(2) Date: Nov. 29, 2018

(87) PCT Pub. No.: WO2017/209150
PCT Pub. Date: Dec. 7, 2017

(65) Prior Publication Data
US 2020/0206689 A1    Jul. 2, 2020

(30) Foreign Application Priority Data

May 31, 2016 (JP) .............................. JP2016-108318
Jun. 24, 2016 (JP) .............................. JP2016-125527

(51) Int. Cl.
*B01D 63/02* (2006.01)
*B01D 69/02* (2006.01)
(Continued)

(52) U.S. Cl.
CPC ............. *B01D 63/02* (2013.01); *B01D 69/02* (2013.01); *B01D 69/08* (2013.01); *B01D 71/34* (2013.01); *B01D 2325/24* (2013.01)

(58) Field of Classification Search
CPC ............ B01D 2325/24; B01D 2325/28; B01D 63/02; B01D 67/0027; B01D 67/009;
(Continued)

(56) References Cited

U.S. PATENT DOCUMENTS

2002/0046970 A1    4/2002  Murase et al.
2003/0094409 A1    5/2003  Minegishi et al.
(Continued)

FOREIGN PATENT DOCUMENTS

CN        1458858 A    11/2003
CN        1621139 A     6/2005
(Continued)

OTHER PUBLICATIONS

English language machine translation of JP2014008426, 25 Pages, No Date.*
(Continued)

*Primary Examiner* — Pranav N Patel
(74) *Attorney, Agent, or Firm* — Birch, Stewart, Kolasch & Birch, LLP

(57) ABSTRACT

This hollow fiber membrane module is provided with: a cylindrical case having a first end and a second end in the direction of height; a plurality of hollow fiber membranes accommodated in the cylindrical case; and a first potting unit attaching the end parts of the plurality of hollow fiber membranes positioned at the first end of the cylindrical case while the end parts are open. The hollow fiber membranes have a rupture strength of 23 MPa or more. The filling rate for the hollow fiber membranes is 40-80%.

10 Claims, 7 Drawing Sheets

(51) Int. Cl.
  *B01D 69/08* (2006.01)
  *B01D 71/34* (2006.01)
(58) Field of Classification Search
  CPC ............ B01D 67/0016; B01D 67/0018; B01D 69/02; B01D 69/08; B01D 71/34; D01F 6/12; Y02A 20/131
  See application file for complete search history.

(56) References Cited

U.S. PATENT DOCUMENTS

| | | |
|---|---|---|
| 2005/0258101 A1 | 11/2005 | Minegishi et al. |
| 2006/0178480 A1 | 8/2006 | Tada et al. |
| 2007/0090051 A1 | 4/2007 | Minegishi et al. |
| 2015/0197431 A1 | 7/2015 | Shiki |
| 2015/0283517 A1 | 10/2015 | Takahashi et al. |
| 2016/0158670 A1 | 6/2016 | Tanizaki et al. |

FOREIGN PATENT DOCUMENTS

| | | | |
|---|---|---|---|
| CN | 103432916 A | | 4/2015 |
| CN | 104772041 A | | 7/2015 |
| CN | 105517693 A | | 4/2016 |
| JP | 11-342320 A | | 12/1999 |
| JP | 2001-38162 A | | 2/2001 |
| JP | 2002-166141 A | | 6/2002 |
| JP | 2006-281202 A | | 10/2006 |
| JP | 2006-297383 A | | 11/2006 |
| JP | 2007-181813 A | | 7/2007 |
| JP | 2010-5615 A | | 1/2010 |
| JP | 4885539 B2 | | 2/2012 |
| JP | 2012-40521 A | | 3/2012 |
| JP | 2014-008426 A | * | 1/2014 |
| JP | 2014-180589 A | | 9/2014 |
| JP | 2015-205273 A | | 11/2015 |
| KR | 10-2005-0109556 A | | 11/2005 |
| WO | WO 03/031038 A1 | | 4/2003 |
| WO | WO 2004/081109 A1 | | 9/2004 |

OTHER PUBLICATIONS

English language machine translation of JP2006297383, 18 Pages, No Date.*
International Search Report, issued in PCT/JP2017/020156, PCT/ISA/210, dated Aug. 15, 2017.
Written Opinion of the International Searching Authority, issued in PCT/JP2017/020156, PCT/ISA/237, dated Aug. 15, 2017.
Accepta: "A Guide to Cost-Effective Membrane Technologies for Minimising Wastes and Effluents," Jun. 18, 2003 (Jun. 18, 2003, XP055585500 [retrieved on May 3, 2019].
Extended European Search Report dated Jan. 3, 2020, in European Patent Application No. 17806703.9.
Office Action dated Dec. 2, 2020, in Chinese Patent Application No. 201780032485.4.
Office Action dated Jan. 21, 2021, in Republic of Korea Patent Application No. 10-2018-7034155.

* cited by examiner

10 μm

10 μm

HOLLOW FIBER MEMBRANE MODULE

TECHNICAL FIELD

The present invention relates to a hollow-fiber membrane module suitable for water purification treatment, industrial water treatment, wastewater treatment, seawater desalination, and treatments of various liquids such as fermentation liquid, food and beverage.

BACKGROUND ART

In recent years, a separation membrane such as microfiltration membrane or ultrafiltration membrane is utilized in various processes including water purification treatment, water production and wastewater treatment fields, food industry and medical fields, etc., because it has advantages of energy saving and space saving and has features of power saving, product quality enhancement, etc.

On the other hand, when membrane separation is applied to raw liquid, a membrane-impermeable substance such as suspended substances (hereinafter sometimes referred to as "suspended solids") and organic matters contained in the raw liquid gradually sticks and deposits on the membrane surface or in a membrane pore to cause clogging of the separation membrane. As the liquid flow resistance of the separation membrane is consequently increased, the power necessary for membrane separation increases, and membrane separation cannot be eventually performed. When it becomes impossible to continue the membrane separation, cleaning of the separation membrane with a chemical solution is generally conducted so as to recover membrane separation performance, but if clogging of the separation membrane proceeds rapidly, the frequency of chemical cleaning is increased, and the processing cost rises.

Various membrane separation operation techniques have therefore been developed with an attempt to continuously maintain the membrane separation performance over a long period of time while eliminating clogging of the separation membrane. Examples thereof include back-washing of passing permeated liquid, water, etc. from the permeation side to the raw liquid side to push out a substance stuck in a membrane pore or on a membrane surface; air scrubbing by feeding a gas from the lower part of a hollow-fiber membrane module to shake the hollow-fiber membrane (i.e., separation membrane in hollow fiber form) and physically cleaning it (see, for example, Patent Document 1): and a flushing method of flowing raw liquid or a chemical solution at a high linear velocity in parallel to a membrane surface on the raw liquid side of a hollow-fiber membrane (see, for example, Patent Document 2).

BACKGROUND ART DOCUMENTS

Patent Documents

[Patent Document 1] JP-A-11-342320
[Patent Document 2] JP-A-2010-005615
[Patent Document 3] Japanese Patent No. 4885539
[Patent Document 4] WO 03/031038
[Patent Document 5] JP-A-2006-297383

SUMMARY OF THE INVENTION

Problems that the Invention is to Solve

In order to continue stable filtration by reducing clogging of the hollow-fiber membrane, cross-flow filtration of performing filtration while flowing a raw liquid in parallel to a membrane surface, air scrubbing, etc. are effective. While, when the membrane surface linear velocity at the time of cross-flow filtration or the flow velocity of air scrubbing is increased, the effect of cleaning the hollow-fiber membrane is intensified, a stress generated in the hollow-fiber membrane may grow to cause breakage of the hollow-fiber membrane. An object of the present invention is to provide a hollow-fiber membrane module allowing for cross-flow filtration at a high membrane surface linear velocity or air scrubbing at a high flow velocity.

Means to Solve the Problems

In order to solve the aforementioned problems, the present invention provides the following techniques [1] to [12].
[1] A hollow-fiber membrane module including:
   a cylindrical case having a first end and a second end in a height direction,
   a plurality of hollow-fiber membranes housed in the cylindrical case, and
   a first potting part which bonds end parts of the plurality of hollow-fiber membranes located on the first end side of the cylindrical case while letting the end parts be open, in which
   the hollow-fiber membrane has a breaking strength of 23 MPa or more, and
   a filling ratio of the hollow-fiber membrane is from 40 to 80%.
[2] The hollow-fiber membrane module according to [1], in which the hollow-fiber membrane module is an external pressure-type hollow-fiber membrane module.
[3] The hollow-fiber membrane module according to [1] or [2], in which the hollow-fiber membrane is a hollow-fiber membrane containing a fluororesin-based polymer,
   the hollow-fiber membrane has a columnar texture oriented in a longitudinal direction thereof,
   a molecular chain in the columnar texture is oriented in the longitudinal direction of the hollow-fiber membrane, and
   a Raman orientation parameter ν of the molecular chain is from 1.5 to 4.0:

$$\text{Raman orientation parameter}=(I1270/I840)\text{parallel}/(I1270/I840)\text{perpendicular} \quad (1)$$

(in which:
   parallel condition: the longitudinal direction of the hollow-fiber membrane is parallel to a polarization direction;
   perpendicular condition: the longitudinal direction of the hollow-fiber membrane is orthogonal to the polarization direction;
   I1270 parallel: the intensity of Raman band at 1,270 $cm^{-1}$ under the parallel condition;
   I1270 perpendicular: the intensity of Raman band at 1,270 $cm^{-1}$ under the perpendicular condition;
   I840 parallel: the intensity of Raman band at 840 $cm^{-1}$ under the parallel condition; and
   I840 perpendicular: the intensity of Raman band at 840 $cm^{-1}$ under the perpendicular condition).
[4] The hollow-fiber membrane module according to any one of [1] to [3], in which the columnar texture has a short-side length of from 0.5 to 3 μm and an aspect ratio of the columnar texture is 3 or more.
[5] The hollow-fiber membrane module according to any one of [1] to [4], wherein a thickness uniformity of the columnar texture is 0.50 or more.

[6] A hollow-fiber membrane module including:
a cylindrical case having a first end and a second end in a height direction,
a plurality of hollow-fiber membranes housed in the cylindrical case, and
a first potting part which bonds end parts of the plurality of hollow-fiber membranes located on the first end side of the cylindrical case while the end parts being open, in which
the hollow-fiber membrane has a breaking strength of 25 MPa or more and
a filling ratio of the hollow-fiber membrane is from 41 to 80%.

[7] The hollow-fiber membrane module according to 161, wherein the hollow-fiber membrane module is an external pressure-type hollow-fiber membrane module.

[8] The hollow-fiber membrane module according to [6] or [7], wherein the hollow-fiber membrane module is a hollow-fiber membrane containing a fluororesin-based polymer,
the hollow-fiber membrane has a columnar texture oriented in a longitudinal direction thereof,
at least a part of molecular chains of the fluororesin-based polymer are oriented in the longitudinal direction of the hollow-fiber membrane, and
in the hollow-fiber membrane, an orientation degree $\pi$ calculated based on the following formula (2) is 0.4 or more and less than 1.0:

$$\text{Orientation degree } \pi = (180° - H)/180° \quad (2)$$

(in which H is a half-width (°) of a diffraction intensity distribution in a circumferential direction of a wide-angle X-ray diffraction image).

[9] The hollow-fiber membrane module according to [8], in which the columnar texture has a short-side length of from 0.5 to 3 μm and an aspect ratio of the columnar texture is 3 or more.

[10] The hollow-fiber membrane module according to [8] or [9], in which a thickness uniformity of the columnar texture is 0.60 or more.

[11] The hollow-fiber membrane module according to any one of [8] to [10], in which the half-width H is a half-width of an intensity distribution obtained by circumferentially scanning a crystal peak (2θ=20.4°) derived from a (110) plane of polyvinylidene fluoride in the wide-angle X-ray diffraction measurement.

[12] The hollow-fiber membrane module according to any one of [8] to [11], in which when wide-angle X-ray diffraction measurement is performed at measurement points at 1 cm intervals in the longitudinal direction of the hollow-fiber membrane, the orientation degree n is 0.4 or more and less than 1.0 at 80% or more of the measurement points.

Advantages of the Invention

In the hollow-fiber membrane module, the breaking strength of the hollow-fiber membrane is 23 MPa or more, enabling cleaning at a high membrane surface linear velocity, and the filling ratio of the hollow-fiber membrane is from 40 to 80%, enabling it to increase the membrane surface linear velocity even when the flow rate is constant, so that high cleaning effect can be obtained.

BRIEF DESCRIPTION OF THE INVENTION

MODE FOR CARRYING OUT THE INVENTION

The hollow-fiber membrane module according to an embodiment of the present invention is described in detail below based on the drawings. However, the present invention is not limited by this embodiment. In the present description, mass % and wt % have the same meaning.

First Embodiment

<Hollow-Fiber Membrane Module>

Figure 1:
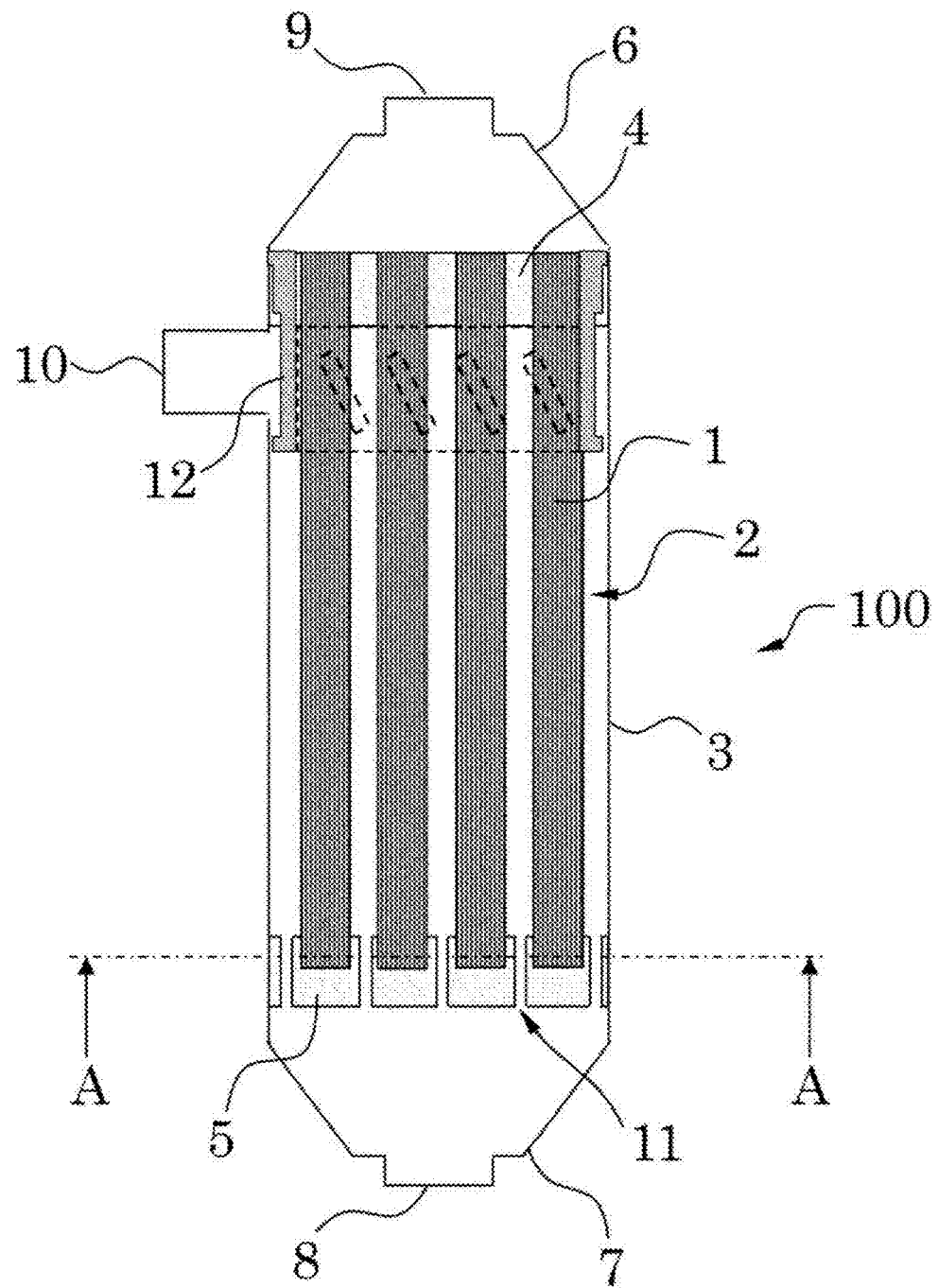
FIG. 1 is a schematic vertical cross-sectional diagram of the hollow-fiber membrane module according to an embodiment of the present invention.

The configuration of the hollow-fiber membrane module according to a first embodiment of the present invention is described by referring to the drawings. FIG. 1 is a schematic vertical cross-sectional diagram of the hollow-fiber membrane module according to a first embodiment of the present invention.

The hollow-fiber membrane module 100 illustrated in FIG. 1 includes a cylindrical case 3 being open at both ends, a large number of hollow-fiber membranes 1 housed in the cylindrical case 3, an upper cap 6 attached to the upper part of the cylindrical case 3, and a lower cap 7 attached to the lower part of the cylindrical case 3. Furthermore, the hollow-fiber membrane module 100 includes a first potting part 4, a second potting part 5, etc. Here, the "upper" and "lower" indicate the top and bottom in a posture when using the module 100 and correspond to the top and bottom of FIG. 1.

On a side surface of the cylindrical case 3, a raw liquid outlet 10 is provided near the upper end of the cylindrical case.

The large number of hollow-fiber membranes 1 are bundled to form a hollow-fiber membrane bundle 2. The filling ratio of the hollow-fiber membrane bundle 2 in the cylindrical case 3 is preferably from 40 to 80%. Details of the filling ratio are described later.

The first potting part 4 is also referred to as an upper potting part. The first potting part 4 is formed of an adhesive and liquid-tightly and airtightly bonds the upper-side end part (corresponding to the "first end part") of the hollow-fiber membrane bundle 2 to the cylindrical case 3 while letting an end face of the hollow-fiber membrane 1 be open. That is, the hollow-fiber membrane bundles 2 are bundled by the first potting part 4 and fixed to the inner wall of the cylindrical case 3.

The hollow-fiber membrane module 100 further includes a flow regulating cylinder 12. The flow regulating cylinder 12 is a tubular member disposed inside of the cylindrical case 3. The flow regulating cylinder 12 is disposed below the first potting part 4. The top and bottom of the flow regulating cylinder 12 are open, and an opening, such as a plurality of slits, is provided on a side surface. The flow regulating cylinder 12 can pass a liquid through the opening. The flow regulating cylinder 12 is provided on the periphery of the raw liquid outlet 10 with the purpose of preventing the treated raw liquid from channeling. For example, in the case of performing cross-flow filtration with a hollow-fiber membrane module without a flow regulating cylinder 12, the flow velocity of the raw liquid within the cylindrical case 3 is increased on the raw liquid outlet 10 side (left side of FIG. 1) and reduced on the side of a surface opposing the raw liquid outlet 10 (right side of FIG. 1) and therefore, the hollow-fiber membrane cleaning performance may be insufficient on the side of a surface opposing the raw liquid outlet 10 (right side of FIG. 1). When the flow regulating cylinder 12 is provided, channeling within the cylindrical case 3 is prevented, and the hollow-fiber membrane cleaning performance can thereby be enhanced.

The second potting part 5 is also referred to as a lower potting part. The second potting part 5 is formed of an adhesive and in the lower-side end part (corresponding to the "second end part") of the hollow-fiber membrane bundle 2, is bonded to the cylindrical case 3 while sealing the lower end face of the hollow-fiber membrane 1. More specifically, the second potting part 5 is disposed to face the first potting part 4 within the cylindrical case 3. Thus, in the lower part of the separation membrane module, the hollow part of the hollow-fiber membrane bundle 2 is sealed by an adhesive and is in a state incapable of opening. The hollow-fiber membrane bundles 2 are bundled by the second potting part 5 and fixed to the inner wall of the cylindrical case 3.

Figure 2:
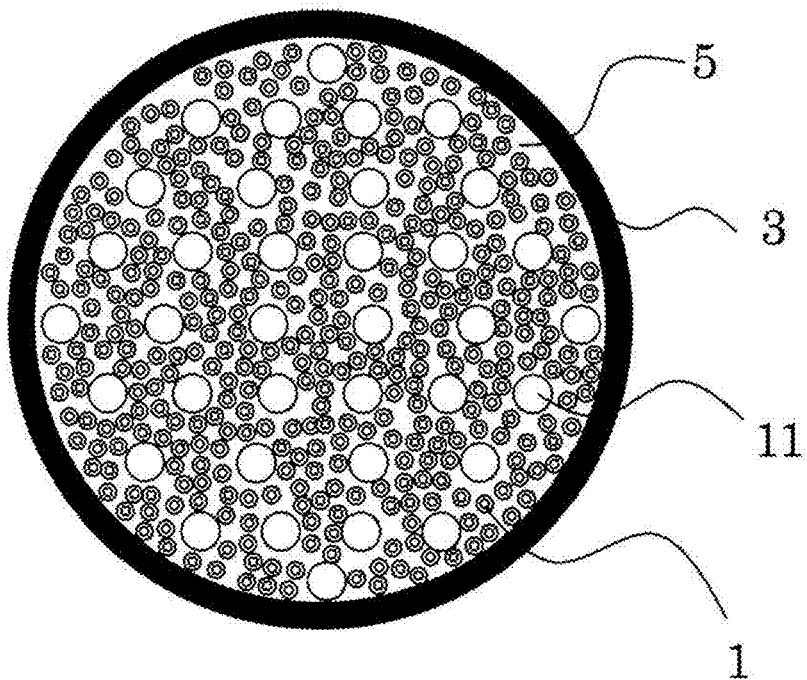
FIG. 2 is an A-A line cross-sectional view of the hollow-fiber membrane module of FIG. 1.

The second potting part 5 has a through hole 11 continuing from a surface opposing the first potting part 4 to the backward surface. The through hole 11 has a role as a raw liquid passage or an air passage at the time of air scrubbing. FIG. 2 is an A-A line cross-sectional view of the hollow-fiber membrane module 100 of FIG. 1 and illustrates an example of the arrangement of through holes 11 in the second potting part 5. In order to prevent a raw liquid channeling during cross-flow filtration or an air channeling during air scrubbing, the through holes 11 are preferably arranged evenly in the second potting part.

The upper cap 6 has a filtered liquid outlet 9. The upper cap 6 is liquid-tightly and airtightly attached to the upper part of the cylindrical case 3. The upper cap 6 is attachable/detachable relative to the upper part of the cylindrical case 3. The lower cap 7 has a raw liquid inflow port 8. The lower cap 7 is liquid-tightly and airtightly attached to the lower part of the cylindrical case 3. The lower cap 7 is attachable/detachable relative to the lower part of the cylindrical case 3.

The raw liquid flows into the hollow-fiber membrane module 100 through the raw liquid inflow port 8 of the lower cap 7, and a raw liquid having not passed through the hollow-fiber membrane 1 is discharged from the raw liquid outlet 10 to the outside of the hollow-fiber membrane module 100. A filtered liquid having passed through the hollow-fiber membrane 1 is discharged from the filtered liquid outlet 9 of the upper cap 6 to the outside of the hollow-fiber membrane module 100. A system of filtering a raw liquid in this way while flowing it in parallel to the membrane surface is referred to as cross-flow filtration and has an effect of preventing suspended substances, etc. in the raw liquid from depositing on the membrane surface or an effect of preventing components contained in the raw liquid from causing concentration polarization on the membrane surface. In addition, a system of, as in FIG. 1, feeding a raw liquid to the outer side of the hollow-fiber membrane and performing filtration from the outer side to the inner side is referred to as an external pressure system. Conversely, a system of performing filtration from the inner side to the outer side of the hollow-fiber membrane is referred to as an internal pressure system.

In the case of performing cross-flow filtration, when the membrane surface linear velocity of raw liquid is increased, the shear stress acting on the membrane surface increases, and the cleaning performance is enhanced. In the cross-flow filtration, a raw liquid flows in through the raw liquid inflow port 8 of the hollow-fiber membrane module 100, and the raw liquid is discharged from the raw liquid outlet 10. In addition, the filtered liquid is delivered to the upper part of the hollow-fiber membrane module 100 through the hollow part of the hollow-fiber membrane and discharged from the filtered liquid outlet 9. The membrane surface linear velocity of cross-flow filtration is preferably from 0.3 to 5 m/s, but if the membrane surface linear velocity is increased, the stress acting on the hollow-fiber membrane increases and therefore, the hollow-fiber membrane may be broken. Above all, in the case of an external pressure-type hollow-fiber membrane module 100 illustrated in FIG. 1, the raw liquid flows out from the raw liquid outlet 10 provided on a side surface of the cylindrical case 3. In the external pressure-type hollow-fiber membrane module thus having a raw liquid inflow port or a raw liquid outlet in a direction perpendicular to the longitudinal direction of the hollow-fiber membrane, a raw liquid flow is generated in a direction perpendicular to the longitudinal direction of the hollow-fiber membrane, and this produces a drag force on the hollow-fiber membrane. The drag force is proportional to the square of the flow velocity and therefore, when the membrane surface linear velocity of cross-flow filtration is increased, a large drag force may be produced on the hollow-fiber membrane around the raw liquid outlet 10 to cause breakage of the hollow-fiber membrane. In order to prevent breakage of the hollow-fiber membrane during cross-flow filtration, the breaking strength of the hollow-fiber membrane is preferably 23 MPa or more, more preferably 26 MPa or more.

Incidentally, a smaller diameter of the hollow-fiber membrane leads to an increase in the specific surface area and is advantageous in view of membrane area but poses a problem that the pressure loss at the time of passing of liquid in the hollow part increases. Accordingly, the inside diameter of the hollow-fiber membrane is preferably 0.5 mm or more. In addition, in order to increase the specific surface area of the hollow-fiber membrane, the outside diameter of the hollow-fiber membrane is preferably 3.0 mm or less. Meanwhile, in the external pressure-type hollow-fiber membrane module, if the transmembrane pressure difference is high, the hollow-fiber membrane may be buckled. As the outside diameter/inside diameter ratio of the hollow-fiber membrane is larger, the pressure resistance is increased and buckling is less likely to occur. For this reason, the outside diameter/inside diameter ratio is preferably 1.5 or more.

In the cross-flow filtration, the membrane surface is cleaned by a raw liquid stream flowing in parallel to the membrane surface, but with the same average linear velocity of raw liquid within the hollow-fiber membrane module, as the distance between hollow-fiber membranes is smaller, the shear stress acting on the membrane surface is higher, and the membrane surface cleaning effect increases. In order to increase the cleaning effect during cross-flow filtration by reducing the inter-membrane distance between hollow-fiber membranes, the filling ratio of the hollow-fiber membrane within the hollow-fiber membrane module is preferably from 40 to 80%, more preferably from 50 to 70%. When the filling ratio of the hollow-fiber membrane is 40% or more, the distance between membranes is reduced, making it possible to increase the cleaning efficiency at the time of cross-flow filtration and prevent a rise in the transmembrane pressure difference. In addition, as the filling ratio of the hollow-fiber membrane is higher, the membrane surface linear velocity can be increased with the same flow rate of raw liquid and thus cleaning effect can be enhanced. Meanwhile, when the filling ratio of the hollow-fiber membrane is 80% or less, the hollow-fiber membrane is easily fixed by the potting part.

The filling ratio of the hollow-fiber membrane as used herein indicates the proportion of the area occupied by a hollow-fiber membrane portion in a transverse cross-section (in FIG. 1, a plane parallel to the horizontal direction and perpendicular to the paper plane) of the cylindrical case 3 of the hollow-fiber membrane module between the first potting part and the second potting part. Denoting S1 as the cross-sectional area of a hollow-fiber membrane existing portion on the inner side of the cylindrical case 3 and S2 as the total cross-sectional area of the hollow-fiber membrane, the filling ratio of the hollow-fiber membrane can be represented by the following formula (3). Here, in the case where a member other than the hollow-fiber membrane, such as flow regulating cylinder 12, is present, the cross-sectional area obtained by subtracting the cross-sectional area of the member other than the hollow-fiber membrane from the cross-sectional area on the inner side of the cylindrical case 3 is denoted by S. In addition, the nozzle portion on a side surface of the cylindrical case 3, which is provided as the raw liquid outlet 10, is also not included in the cross-sectional area S. When an inner-side member such as flow regulating cylinder 12, a reduced diameter part or an expanded diameter part is present in the cylindrical case 3, the cross-sectional area S is changed in that portion. In the present invention, with respect to the space between the second potting part-side interface of the first potting part of the hollow-fiber membrane module and the first potting-side interface of the second potting part, the cross-sectional area S is calculated for 10 sites at regular intervals and denoting the average value thereof as the cross-sectional area S1 of the hollow-fiber membrane existing portion, the filling ratio of the hollow-fiber membrane is calculated according to the following formula (3):

$$\text{Filling ratio [\%] of hollow-fiber membrane} = S2/S1 \times 100 \quad (3)$$

Here, the total cross-sectional area S2 of the hollow-fiber membrane can be represented by the following formula (4). With respect to 10 hollow-fiber membranes in the hollow-fiber membrane module, the outside diameter is measured for every two directions of longest direction and shortest direction, and the average value of measured values of a total of the 20 sites is designated as the outside diameter R of the hollow-fiber membrane. Using the outside diameter R and assuming the hollow-fiber membrane is a perfect circle, the total cross-sectional area S2 of the hollow-fiber membrane is calculated according to formula (4):

$$S2 = [\text{circular constant}] \times [\text{outside diameter } R \text{ of hollow-fiber membrane}/2]^2 \times [\text{number of hollow-fiber membranes within hollow-fiber membrane module}] \quad (4)$$

The above-described average linear velocity of raw liquid within the hollow-fiber membrane module can be represented by the following formula (5):

$$\text{Average linear velocity [m/s]} = \text{flow rate of raw liquid } [m^3/s]/(S1-S2)[m^2] \quad (5)$$

<Potting Method of Hollow-Fiber Membrane Module>

Bundling hollow-fiber membranes with an adhesive is referred to as potting. The method for potting includes, as representative methods, a centrifugal potting method in which a liquid adhesive is infiltrated among hollow fiber membranes by utilizing centrifugal force and then cured: and a static potting method in which a liquid adhesive is fed by a metering pump or head, allowed to naturally flow and thereby infiltrate among hollow fiber membranes 1, and then cured. In the centrifugal potting method, an adhesive readily infiltrates among hollow fiber membranes due to centrifugal force, and even a high-viscosity adhesive can be used.

<Material of Hollow-Fiber Membrane>

The material for the hollow-fiber membrane of the hollow-fiber membrane module of the present invention is not particularly limited, but a hollow-fiber membrane containing, for example, a fluororesin-based polymer may be used.

The fluororesin-based polymer as used in the present description means a resin containing at least one of a vinylidene fluoride homopolymer and a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer and other fluorine-based monomer, etc. Such a copolymer includes, for example, a copolymer of vinylidene fluoride and one or more kinds of monomers selected from vinyl fluoride, tetrafluoroethylene, hexafluoropropylene and chlorotrifluoroethylene.

In addition, a monomer other than the above-described fluorine-based monomer, such as ethylene, may be copolymerized to the extent not impairing the effects of the present invention.

The weight average molecular weight of the fluororesin-based polymer may be appropriately selected according to the strength and water permeation performance required for the polymer separation membrane, but as the weight average molecular weight is larger, the water permeation performance is reduced, and as the weight average molecular weight is smaller, the strength is reduced. For this reason, the weight average molecular weight is preferably from 50,000 to 1,000,000. In the case of a water treatment application where the polymer separation membrane is subject to chemical cleaning, the weight average molecular weight is preferably from 100,000 to 700,000, more preferably from 150,000 to 600.000.

The hollow-fiber membrane preferably contains the fluororesin-based polymer as a main component, and the proportion of the fluororesin-based polymer in the hollow-fiber membrane is preferably 80 wt % or more, more preferably 90 wt % or more, still more preferably 95 wt % or more. The hollow-fiber membrane may be composed of only the fluororesin-based polymer.

Here, the "hollow-fiber membrane containing the fluororesin-based polymer as a main component" can be interchanged with the "hollow-fiber membrane based on the fluororesin-based polymer". In the present description, other elements are also described by the phrase "X contains Y as a main component", and this can similarly be interchanged with "X is based on Y".

<Columnar Texture>
(a) Dimension

Figure 4:
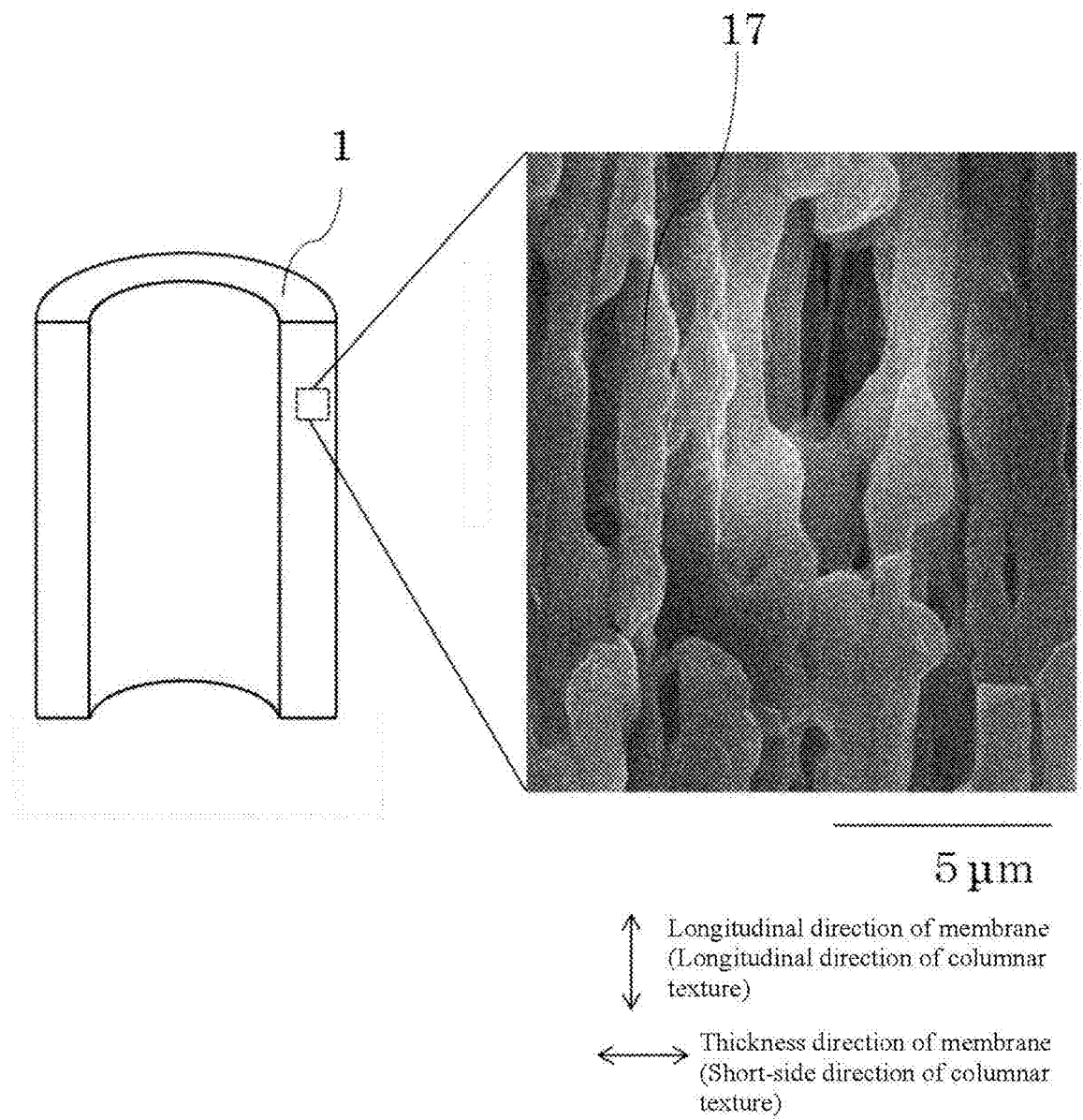
FIG. 4 is a diagram illustrating a photograph of a cross-section in the longitudinal direction of the hollow-fiber membrane.

As illustrated in FIG. 4, the hollow-fiber membrane 1 has a columnar texture 17 oriented in the longitudinal direction of the hollow-fiber membrane 1. The "columnar texture" is a solid material having a uniform thickness and having a shape long in one direction. The aspect ratio (longitudinal length/short-side length) of the columnar texture is preferably 3 or more. In FIG. 4, the columnar structure is photographically shown and therefore, a scale is indicated, but the present invention is not limited thereto.

Here, the "longitudinal length" indicates a length in the longitudinal direction of the columnar texture. The "short-side length" is an average length in the short-side direction of the columnar texture. Furthermore, "oriented in the longitudinal direction" means that out of angles between the longitudinal direction of the columnar texture and the longitudinal direction of the hollow-fiber membrane, the acute angle is within 20°.

The longitudinal length and short-side length can be measured as follows. A hollow-fiber membrane is cut along the longitudinal direction of the hollow-fiber membrane, and the obtained cross-section is observed using a scanning electron microscope (SEM). The magnification is variable according to the length of the columnar texture and is set to a level allowing a visual field to include the entire figure of each of 5, preferably 10, columnar textures over its longitudinal direction. In the case where the length in the longitudinal direction varies in one columnar texture, a maximum length in the longitudinal direction may be measured as the longitudinal length. The short-side length is determined by measuring the length in each short-side direction at a predetermined number of arbitrary measurement points in one columnar texture and calculating an average value thereof. The number of measurement points is a value obtained by dividing the longitudinal length (μm) by 1 μm (rounded down to the nearest integer). For example, when the longitudinal length of the columnar texture is 20.5 μm, the number of measurement points is 20. In this connection, when the value becomes 21 or more, the length may be measured at arbitrary 20 points.

The longitudinal length of the columnar texture is not particularly limited but is preferably 7 μm or more, more preferably 10 μm or more, still more preferably 15 μm or more. The longitudinal length of the columnar texture is, for example, preferably 50 μm or less, more preferably 40 μm or less.

In the present invention, the short-side length of the columnar texture is preferably from 0.5 to 3 μm. The short-side length is preferably in the range above, because high strength performance and high pure-water permeation performance are obtained. When the short-side length of the columnar texture is 0.5 μm or more, physical strength of the columnar texture itself is increased and therefore, high strength is obtained. When the short-side length of the columnar texture is 3 μm or less, the void among columnar textures becomes large and in turn, good pure-water permeation performance is obtained. The short-side length of the columnar texture is more preferably from 0.7 to 2.5 μm, still more preferably from 1 to 2 μm.

In the hollow-fiber membrane of the present invention, preferable ranges of representative values of the longitudinal length and short-side length of the columnar texture are respectively the same as the above-described preferable ranges of the longitudinal length and short-side length of each individual columnar texture. In addition, as for the effects due to each representative value being in that range, description of effects when individual columnar textures have a dimension in that range is applied.

The representative value of the longitudinal length is measured as follows. Similar to the measurement of the longitudinal length, the longitudinal length is measured at 3 sites, preferably 5 sites, in the hollow-fiber membrane for 5, preferably 10, columnar textures per site. With respect to the obtained values of the longitudinal length, an average value is determined and can be used as the representative value of the longitudinal length of the columnar texture.

The representative value of the short-side length is determined by measuring the short-side length (calculated as an average value) as described above for columnar textures which were subject to measurement of the representative value of the longitudinal length, and calculating an average value thereof.

In the hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, yet still more preferably 20 or more.

In the present invention, it is preferred that the short-side length of the columnar texture is from 0.5 to 3 μm and the aspect ratio of the columnar texture is 3 or more. Incidentally, the upper limit of the aspect ratio is not particularly limited but may be, for example, 50 in consideration of the existing production method, etc. of the hollow-fiber membrane.

(b) Thickness Uniformity

As described later, the hollow-fiber membrane of the present invention can be produced by forming a hollow fiber from a membrane-forming solution containing a polymer, and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.50 or more, more preferably 0.60 or more, still more preferably 0.70 or more, yet still more preferably 0.80 or more. Although the thickness uniformity is 1.0 at a maximum, the columnar texture may have a thickness uniformity of less than 1.0.

In the hollow-fiber membrane, the columnar texture has a high thickness uniformity in this way, i.e., a narrowed portion is little formed in the columnar texture, and the elongation of the hollow-fiber membrane is thereby increased.

When the hollow-fiber membrane after stretching keeps high elongation, this is advantageous in that fiber breakage is less likely to occur even at the time of an abrupt application of load. The elongation at break of the hollow-fiber membrane is preferably 50% or more, more preferably 80% or more. The upper limit of the elongation at break of the hollow-fiber membrane is not particularly limited but is, for example, 500% in consideration of the above thickness uniformity.

The thickness uniformity is described below. As the length variation among respective short-side directions of the columnar texture is smaller, a narrowed portion is less formed in the columnar texture, resulting in high thickness uniformity, and the columnar texture comes close to a perfect column.

The thickness uniformity of the columnar texture is determined by comparing a first cross-section and a second cross-section each running in parallel to the short-side direction of the hollow-fiber membrane. This is specifically described below.

At the beginning, a first cross-section and a second cross-section running in parallel to each other are selected. The distance between the first cross-section and the second cross section is set to be 5 μm. In each cross-section, a portion composed of resin and a void portion are distinguished, and the area of resin portion and the area of void portion are measured. Next, the area of a portion where when the first cross-section is projected onto the second cross-section, the portion composed of resin in the first cross-section and the portion composed of resin in the second cross-section are overlapped, namely, the overlap area, is determined. With respect to arbitrary 20 pairs of first cross-section and second cross-section in one hollow-fiber membrane, thickness uniformities A and B are determined based on the following formulae (6) and (7), respectively:

Thickness uniformity $A$=(overlap area)/(area of resin portion of second cross-section) (6)

Thickness uniformity $B$=(overlap area)/(area of resin portion of first cross-section) (7)

That is, 20 pairs of thickness uniformities A and B are obtained for one hollow-fiber membrane. A larger value means that the thickness of the columnar texture is more uniform. Then, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane have a value of 0.50 or more, the hollow-fiber membrane can be said to have a columnar texture referred to in the present invention.

In measuring the thickness uniformity, in order to clearly distinguish the resin portion and the void portion, it is preferable to previously perform resin-embedding of the hollow-fiber membrane in an epoxy resin, etc. and staining treatment of the epoxy resin, etc. with, for example, osmium. By such resin embedding/staining treatment, the void portion is filled with an epoxy resin, etc., and at the time of the later-described cross-sectional processing with a focused ion beam, the portion composed of a fluororesin-based polymer and the void portion (i.e., the epoxy resin portion) can be clearly distinguished, as a result, high observation accuracy is obtained.

Furthermore, in order to obtain the above-described first cross-section and second cross-section each running in parallel to the short-side direction of the hollow-fiber membrane, a scanning electron microscope (SEM) equipped with a focused ion beam (FIB) is preferably used. A face parallel to the short-side direction of the hollow-fiber membrane is cut out using FIB, and FIB cutting and SEM observation are repeatedly conducted 200 times at 50 nm intervals toward the longitudinal direction of the hollow-fiber membrane. By such continuous cross-sectional observation, information at a depth of 10 μm can be obtained. Arbitrary first and second cross-sections forming faces running in parallel to each other and being spaced 5 μm apart are selected therefrom, and the thickness uniformities can be determined using formulae (6) and (7). The observation magnification may be sufficient if it is a magnification enabling clear identification of a columnar texture and a spherical texture, and a magnification of, for example, from 1,000 to 5,000 times may be used.

(c) Composition

The columnar texture preferably contains the fluororesin-based polymer as a main component, and the proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the hollow-fiber membrane has a solid matter containing a fluororesin-based polymer, and at least part of the solid matter constitutes a columnar texture. All of solid matters containing a fluororesin-based polymer may constitute a columnar texture, or part thereof may have a shape not falling under a columnar texture. In the hollow-fiber membrane, out of solid matters containing a fluororesin-based polymer, the proportion of the solid matter constituting a columnar texture is preferably 80 wt % or more, more preferably 90 wt % or more, still more preferably 95 wt % or more.

(d) Columnar Texture in Hollow-Fiber Membrane

In the hollow-fiber membrane, the principal structure is preferably a columnar texture. The proportion of the columnar texture in the hollow-fiber membrane is preferably 80 wt % or more, more preferably 90 wt % or more, still more preferably 95 wt % or more. The hollow-fiber membrane may be composed of only a columnar texture.

More specifically, the hollow-fiber membrane preferably has, as the principal structure, a columnar texture containing a fluororesin-based polymer as a main component.

The hollow-fiber membrane can also be phrased as an assembly of columnar textures.

<Orientation of Molecular Chain>

(a) Raman Orientation

The orientation of the molecular chain of the columnar texture constituting the hollow-fiber membrane of the present invention can be determined by orientation analysis according to Raman spectroscopy. First, a hollow-fiber membrane is sliced by cutting with a microtome from a cross-section along the longitudinal direction of the hollow-fiber membrane. The thus-obtained section is observed under an optical microscope, and laser Raman measurement is thereby performed at 1 μm intervals along the longitudinal direction of a columnar texture while checking the columnar texture. The number of measurement points in one columnar texture is a value obtained by dividing the longitudinal length (μm) of the later-described columnar texture by 1 μm (rounded down to the nearest integer). For example, when the longitudinal length of the columnar texture is 20.5 μm, the number of measurement points is 20.

Since strong Raman scattering is obtained when the vibration direction of molecular chain coincides with the polarization direction of incident light, the orientation degree can be calculated by appropriately selecting a vibration mode showing a vibration direction parallel to molecular chain and a vibration mode showing a vibration direction perpendicular to molecular chain, and determining the scattering intensity ratio therebetween.

For example, in the case where the fluororesin-based polymer is a polyvinylidene fluoride homopolymer, the Raman band around 1,270 cm$^{-1}$ is assigned to a coupling mode of $CF_2$ (fluorocarbon) stretching vibration and CC (carbon-carbon) stretching vibration. The vibration direction of these vibrations is in a mode parallel to molecular chain. Meanwhile, the vibration direction of the Raman band around 840 cm$^{-1}$ is perpendicular to molecular chain.

The Raman orientation parameter can therefore be calculated according to the following formula (1). The Raman orientation parameter shows a larger value as the orientation in the longitudinal direction of the hollow-fiber membrane is higher, shows a value of 1 when non-orientated, and shows a value smaller than 1 when the orientation in the short-side direction is high.

$$\text{Raman orientation parameter} = (I1270/I840)\text{parallel}/(I1270/I840)\text{perpendicular} \quad (1)$$

In formula (1), parallel condition: the longitudinal direction of the hollow-fiber membrane is parallel to the polarization direction, perpendicular condition: the longitudinal direction of the hollow-fiber membrane is orthogonal to the polarization direction, I1270 parallel: the intensity of Raman band at 1,270 $cm^{-1}$ under parallel condition, I1270 perpendicular: the intensity of Raman band at 1,270 $cm^{-1}$ under perpendicular condition, I840 parallel: the intensity of Raman band at 840 $cm^{-1}$ under parallel condition, and I840 perpendicular: the intensity of Raman band at 840 $cm^{-1}$ under perpendicular condition.

In one hollow-fiber membrane, 10 columnar textures different from each other, having a length of 0.5 to 1.5 times the representative value of the longitudinal length of the later-described columnar texture, are selected. With respect to each columnar texture, laser Raman measurement is performed at 1 μm intervals as described above, and the Raman orientation parameters of respective measurement points are calculated according to formula (1). An average value of the obtained values is defined as the Raman orientation parameter ν.

In addition, an operation of selecting the largest Raman orientation parameter and the smallest Raman orientation parameter among the measurement points of one columnar texture is performed for 10 columnar textures different from each other. With respect to selected 10 largest Raman orientation parameters and 10 smallest Raman orientation parameters, respective average values are calculated as a maximum Raman orientation parameter M and a minimum Raman orientation parameter m.

In order to accurately obtain the Raman orientation parameter ν, maximum Raman orientation parameter M, minimum Raman orientation parameter m and the later-described M/m, the measurement is preferably performed for 20 columnar textures different from each other.

In the hollow-fiber membrane of the present invention, the Raman orientation parameter ν of the molecular chain in the longitudinal direction of the hollow-fiber membrane is preferably 1.5 or more, 2.0 or more, or 2.5 or more. When the Raman orientation parameter ν is 1.5 or more, the strength of the hollow-fiber membrane is increased. In addition, the Raman orientation parameter ν is preferably 4.0 or less, or 3.0 or less.

It is considered that the maximum Raman orientation parameter M and the minimum Raman orientation parameter m indicate respectively the orientation degree at a main orientation site in the columnar texture and the orientation degree in a portion working out to a point of effort during stretching.

Accordingly, M and m may be set to appropriate ranges by taking into account a balance of performances of the obtained hollow-fiber membrane, such as strength, elongation and water permeability. In order to provide high toughness to the hollow-fiber membrane, M and m are preferably 4.0 or less, more preferably 3.5 or less, still more preferably 3.0 or less. Incidentally, the lower limit value is not particularly limited but is, for example, 1.1.

It is likely that as the Raman orientation parameter ν, M and m are larger, the orientation of molecular chain develops and the strength of the hollow-fiber membrane increases. On the other hand, if the ratio M/m of the maximum Raman orientation parameter M and the minimum Raman orientation parameter m is too large, i.e., if the difference in the orientation degree between a portion where orientation has developed and a portion where orientation has not developed is too large, a stress concentrates on a portion where orientation has not developed, and the hollow-fiber membrane is readily buckled and loses toughness. For this reason, in the present invention, M/m is preferably from 1.5 to 4.0, more preferably from 2.0 to 3.5, still more preferably from 2.5 to 3.0.

(b) Orientation Degree in X-Ray Diffraction Measurement

In the hollow-fiber membrane of the present invention, the molecular chain of the fluororesin-based polymer is oriented in the longitudinal direction of the hollow-fiber membrane, and the orientation degree π of the molecular chain in X-ray diffraction measurement is less than 0.4, or the molecular chain is non-oriented. The orientation degree π is calculated from a half-width H (°) obtained by wide-angle X-ray diffraction measurement, based on the following formula (2):

$$\text{Orientation degree } \pi = (180° - H)/180° \quad (2)$$

(wherein H is a half-width (°) of the diffraction intensity distribution in the circumferential direction of a wide-angle X-ray diffraction image).

The method for measuring the orientation degree π of the molecular chain in the longitudinal direction of the hollow-fiber membrane is specifically described below.

In order to calculate the orientation degree π, the hollow-fiber membrane is fixed to a fiber sample stage by arranging its longitudinal direction to run vertically. Here, the short-side direction of the hollow-fiber membrane is a direction parallel to the diameter direction of the hollow fiber, and the longitudinal direction is a direction perpendicular to the short-side direction. The short-side direction can be interchanged with a direction parallel to the hollow plane, i.e., an in-plane direction of the hollow plane, and the longitudinal direction can be interchanged with a direction perpendicular to the hollow plane.

When X-ray diffraction is performed, an annular diffraction image called a Debye-Scherrer ring is obtained. In the case of a non-oriented sample, a great change is not observed in the diffraction intensity along the Debye-Scherrer ring, but in the case of an oriented sample, the intensity distribution is deviated on the Debye-Scherrer ring. Accordingly, the orientation degree can be calculated from this intensity distribution based on formula (2).

More specifically, in the case where the molecular chain is non-oriented, when 2θ/θ scanning is performed in the short-side direction (i.e., when a diffraction pattern showing a diffraction intensity distribution in the diameter direction of Debye-Scherrer ring is obtained), a peak is observed at a position around the diffraction angle 2θ=20°. The abscissa axis of the diffraction pattern obtained here is the diffraction angle 2θ of X-ray, and the ordinate axis is the diffraction intensity. Furthermore, when the sample is scanned in the azimuth angle β direction by fixing the diffraction angle 2θ to the peak position above, i.e., around 20°, a diffraction pattern in which the abscissa axis shows the azimuth angle θ and the ordinate axis shows the diffraction intensity (i.e., a diffraction intensity distribution along the circumferential direction of Debye-Scherrer ring at the position of diffraction angle 2θ=20°) is obtained. In the case of a non-oriented sample, the diffraction intensity is substantially constant throughout 360° in the circumferential direction of Debye-Scherrer ring.

On the other hand, in the case where the molecular chain is oriented in the longitudinal direction of the hollow-fiber membrane, a strong diffraction intensity is observed on the azimuth angle corresponding to the short-side direction of the hollow-fiber membrane (i.e., on the equatorial line) on the Debye-Scherrer ring around 2θ=20°, and a small diffraction intensity is obtained in other portions. More specifically, in the case of an oriented sample, the diffraction intensity distribution in the diameter direction of Debye-Scherrer ring shows a diffraction peak around 2θ=20°, similarly to a non-oriented sample, and the distribution in the circumferential direction shows, unlike a non-oriented sample, a diffraction peak on the azimuth angle corresponding to the short-side direction of the hollow-fiber membrane.

In the description above, the position of diffraction peak in the diameter direction of Debye-Scherrer ring (i.e., the value of 2θ corresponding to the diffraction peak) is "around 20°". However, the value of 2θ differs depending on the structure or blending of polymer and may range from 15 to 25°. For example, when X-ray diffraction is performed for a polyvinylidene fluoride homopolymer having an α crystal or β crystal, a diffraction peak derived from a (110) plane of α crystal or β crystal, i.e., a plane parallel to molecular chain, is observed around 2θ=20.4°.

As described above, the intensity distribution in the azimuth angle direction is obtained by fixing the value of diffraction angle 2θ and furthermore, measuring the intensity in the range from 0° up to 360° in the azimuth angle direction (circumferential direction). This intensity distribution may also be said to be an intensity distribution obtained by scanning a crystal peak on a diffraction image in the circumferential direction. Here, when the ratio between the intensity at an azimuth angle of 180° (longitudinal direction) and the intensity at an azimuth angle of 90° (short-side direction) is 0.80 or less or 1.25 or more, it is regarded that a peak is present, and using the intensity distribution in this azimuth angle direction, the width at a position of half the peak height (half-width H) is determined.

In the intensity distribution obtained by scanning a crystal peak in the circumferential direction, when the ratio between the intensity at an azimuth angle of 180° and the intensity at an azimuth angle of 90° is more than 0.80 and less than 1.25, it is regarded that a peak is absent. That is, in this case, the fluororesin-based polymer is determined to be non-oriented. The orientation degree π is calculated by substituting the half-width H into formula (2).

In the hollow-fiber membrane of the present invention, the orientation degree π of the molecular chain of the fluororesin-based polymer in the longitudinal direction of the hollow-fiber membrane is preferably less than 0.4. Here, the molecular chain of the fluororesin-based polymer may be non-oriented relative to the longitudinal direction of the hollow-fiber membrane. High toughness is obtained when the hollow-fiber membrane is in the state of small orientation degree, particularly, in the non-oriented state. Incidentally, when wide-angle X-ray diffraction measurement is performed at measurement points at intervals of 1 cm in the longitudinal direction of the hollow-fiber membrane, it is preferred that at 80% or more of the measurement points, the orientation degree n of the molecular chain of the fluororesin-based polymer is less than 0.4 or the molecular chain of the fluororesin-based polymer is non-oriented.

In the case where the hollow-fiber membrane contains an α crystal or β crystal of polyvinylidene fluoride, the half-width H is preferably determined from an intensity distribution obtained by circumferentially scanning a crystal peak (2θ=20.4°) derived from a (110) plane of the α crystal or β crystal of polyvinylidene fluoride in wide-angle X-ray diffraction measurement.

There is a tendency that the orientation degree π determined by wide-angle X-ray diffraction measurement represents the orientation of molecular chain of the entire porous hollow-fiber membrane and the Raman orientation parameter ν determined by Raman spectroscopy represents the orientation of molecular chain when focus is directed onto the columnar texture of the porous hollow-fiber membrane, i.e., the orientation of local molecular chain. In the hollow-fiber membrane of the present invention, crystal orientation of the entire porous hollow-fiber membrane in wide-angle X-ray diffraction is not observed, but the local molecular chain in Raman spectroscopy is in the oriented state, so that both high strength and high toughness can be achieved.

It is preferred that the orientation degree π by wide-angle X-ray diffraction is less than 0.4 or the molecular chain is non-oriented and the Raman orientation parameter ν by Raman spectroscopy is 1.5 or more, and it is more preferred that the Raman orientation parameter ν is 2.0 or more.

<Porosity>

In the hollow-fiber membrane of the present invention, in order to satisfy both high pure-water permeation performance and high strength, the porosity is preferably from 40 to 80%, more preferably from 45 to 75%, still more preferably from 50 to 70%. If the porosity is less than 40%, the pure-water permeation performance is reduced, whereas if it exceeds 80%, the strength significantly decreases and therefore, the membrane lacks suitability as a hollow-fiber membrane for water treatment.

The porosity of the hollow-fiber membrane is determined according to the following formula (8) by using the area of resin portion and the area of void portion in the above-described cross-section. In order to increase the accuracy, it is preferable to determine the porosity for arbitrary 20 or more, preferably 30 or more, cross-sections and use an average value thereof.

$$\text{Porosity (\%)} = \{100 \times (\text{area of void portion})\} / \{(\text{area of resin portion}) + (\text{area of void portion})\} \quad (8)$$

<Young's Modulus>

The hollow-fiber membrane of the present invention preferably has high toughness suitable for practical use, and the toughness can be denoted by the Young's modulus of a tensile test. The Young's modulus of the hollow-fiber membrane may be selected according to use of the hollow-fiber membrane but is preferably 0.15 GPa or more and less than 0.40 GPa, more preferably 0.22 GPa or more and less than 0.38 GPa, still more preferably 0.24 GPa or more and less than 0.36 GPa. If the Young's modulus falls below 0.15 GPa, the hollow-fiber membrane is likely to be deformed due to a stress applied during use. In addition, if the Young's modulus is 0.40 GPa or more, when the hollow membrane is shaken, for example, by scrubbing cleaning, etc. which is frequently conducted in the application for water treatment, the yean breakage in hollow-fiber membrane readily occurs <Others>

The hollow-fiber membrane of the present invention may contain a texture other than the above-described columnar texture to the extent not departing from the object of the present invention. The structure other than the columnar texture includes, for example, a spherical texture having an aspect ratio (longitudinal length/short-side length) of less than 3. The short-side length and longitudinal length of the spherical texture are preferably from 0.5 to 3 µm. In the case of using a spherical texture, as long as the short-side length and longitudinal length thereof are in the range above, reduction in the strength of the hollow-fiber membrane can be prevented, and good pure-water permeation performance can be maintained.

However, if the proportion of such a spherical texture having an aspect ratio of less than 3 in the hollow-fiber membrane is increased, there arises a tendency that spherical textures are increasingly coupled with each other to increase the narrowed portion and it is difficult to perform high-ratio stretching or keep the elongation after stretching. For this reason, a smaller proportion of the spherical texture in the hollow-fiber membrane is more preferred, and the proportion is preferably less than 20%, more preferably less than 10%, still more preferably less than 1%, i.e., almost nil. It is most preferred that the spherical texture is not present at all.

Here, the occupancy (%) of each texture is determined according to the following formula (9) after taking a photograph of a cross-section in the longitudinal direction of the porous hollow-fiber membrane by means of SEM, etc. at a magnification enabling clear identification of a columnar texture and a spherical texture, preferably at a magnification of 1,000 to 5.000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture})/(\text{area of entire photograph})\} \times 100 \quad (9)$$

Incidentally, the area of the entire photograph and the area occupied by a texture can be determined preferably by employing, for example, a method of converting the area into a weight corresponding to each texture photographed. That is, the photograph taken may be printed on paper, and the weight of paper corresponding to the entire photograph and the weight of paper corresponding to a texture portion cut out therefrom may be measured. In addition, before taking a photograph by SEM, etc., the above-described resin embedding/staining treatment and FIB cutting are preferably applied, because the observation accuracy increases.

The hollow-fiber membrane of the present invention may be a membrane in which a layer having the above-described columnar texture and a layer having other structure are stacked to the extent not departing from the object of the present invention. However, if the thickness of the layer having other structure is large compared with the layer having the columnar texture, the object and effects of the present invention can hardly be exerted and therefore, the ratio of the thickness of the layer having other structure to the thickness of the layer having the columnar texture is preferably 0.3 or less, more preferably 0.2 or less.

In the hollow-fiber membrane of the present invention, it is preferred that the pure-water permeation performance at 50 kPa and 25° C. is 0.7 $m^3/m^2/hr$ or more and the breaking strength is 23 MPa or more, and it is more preferred that the pure-water permeation performance at 50 kPa and 25° C. is 0.7 $m^3/m^2/hr$ or more and the breaking strength is 25 MPa or more. Above all, from the viewpoint of providing a high-performance hollow-fiber membrane satisfying both high pure-water permeation performance and high strength performance, it is preferred that the pure-water permeation performance at 50 kPa and 25° C. is from 0.7 to 5.0 $m^3/m^2/hr$ and the breaking strength is from 23 to 70 MPa, and it is more preferred that the pure-water permeation performance at 50 kPa and 25° C. is from 0.7 to 5.0 $m^3/m^2/hr$ and the breaking strength is from 30 to 60 MPa.

The measurement of pure-water permeation performance is performed by manufacturing a miniature module of 200 mm in length including 4 porous hollow-fiber membranes. External pressure dead-end filtration of reverse osmosis membrane filtrate is performed for 10 minutes under the conditions of a temperature of 25° C. and a filtration pressure difference of 16 kPa, and the permeation amount ($m^3$) is determined. The permeation amount ($m^3$) is converted into a value per unit time (h) and effective membrane area ($m^2$), further multiplied by (50/16), and thereby converted into a value at a pressure of 50 kPa to determine the pure-water permeation performance.

The methods for measuring the breaking strength and the elongation at break are not particularly limited but, for example, using a tensile tester, a tensile test of a sample having a measurement length of 50 mm is performed 5 or more times by changing the sample at a tensile speed of 50 mm/min, and the breaking strength and the elongation at break can be measured by determining average values thereof.

The hollow-fiber membrane described above has sufficient pure-water permeation performance, strength and elongation for water purification treatment, industrial water treatment, wastewater treatment, seawater desalination, and treatment of various liquids such as fermented liquid, food and beverage.

<Production Method of Hollow-Fiber Membrane>

The method for producing the hollow-fiber membrane of the present invention is described below by way of example. The method for producing a hollow-fiber membrane includes at least:

1) a step of forming a hollow fiber having a columnar texture from a membrane-forming solution containing a fluororesin-based polymer by thermally induced phase separation, in which the columnar texture is oriented in the longitudinal direction and has a thickness uniformity of 0.50 or more and less than 1.00; and 2) a step of stretching the porous hollow fiber obtained in 1) above to 1.8 to 2.7 times in the longitudinal direction at a stretching speed of 1 to 150%/sec.

(a) Preparation of Membrane-Forming Solution

The production method of the porous hollow-fiber membrane in the present invention further includes a step of preparing a fluororesin-based polymer solution. A fluororesin-based polymer solution (i.e., a membrane-forming solution containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming solution is high, a hollow-fiber membrane having high strength is obtained. On the other hand, when the polymer concentration is low, the porosity of the hollow-fiber membrane is increased, and the pure-water permeation performance is enhanced. Accordingly, the concentration of the fluororesin-based polymer is preferably from 20 to 60 wt %, more preferably from 30 to 50 wt %.

In the present invention, the poor solvent is a solvent in which the fluororesin-based polymer cannot be dissolved to a concentration of 5 wt % or more at a low temperature of 60° C. or less but can be dissolved to a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved to a concentration of 5 wt % or more even in a low-temperature region of 60° C. or less. The nonsolvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes cyclohexanone, isophorone, γ-butyrolactone, methyl isoamyl ketone, propylene carbonate, dimethylsulfoxide, etc., and a mixed solvent thereof. The good solvent includes N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof. The nonsolvent includes water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, a mixed solvent thereof, etc.

(b) Formation of Hollow Fiber

In the hollow fiber forming step, a hollow fiber is obtained from a membrane-forming solution containing a fluororesin-based polymer by utilizing a thermally induced phase separation method of inducing phase separation by temperature change. In order to perform the later-described high-ratio stretching of 1.8 times or more, it is preferred that the hollow fiber has a columnar texture oriented in its longitudinal direction and the thickness uniformity of the columnar texture is 0.50 or more and less than 1.00. The lower limit of the thickness uniformity of the columnar texture is more preferably 0.60 or more, still more preferably 0.70 or more, yet still more preferably 0.80 or more.

In the thermally induced phase separation method, two kinds of phase separation mechanisms are mainly utilized. One is a liquid-liquid phase separation method in which a polymer solution dissolved uniformly at a high temperature is separated into a polymer-rich phase and a polymer-poor phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow fiber. This is because the polymer-rich phase forms a very fine phase by phase separation before the structure is fixed, and cannot be made columnar.

As a specific method, a hollow part-forming liquid is discharged through an inner tube of a double tube-type spinneret for spinning of a hollow-fiber membrane while discharging the above-described membrane-forming solution through an outer tube of the double tube-type spinneret. The thus-discharged membrane-forming solution is cooled and solidified in a cooling bath to obtain a hollow-fiber.

The fluororesin-based polymer solution is, before being discharged from the spinneret, held in a specific temperature condition for a given time under pressure. The pressure is preferably 0.5 MPa or more, more preferably 1.0 MPa or more. The temperature T of the polymer solution preferably satisfies $Tc+35°\ C.\leq T\leq Tc+60°\ C.$, more preferably satisfies $Tc+40°\ C.\leq T\leq Tc+55°\ C.$ Tc is the crystallization temperature of the fluororesin-based polymer solution. The time for which the polymer solution is held under these pressure and temperature is preferably 10 seconds or more, more preferably 20 second or more.

Specifically, at any site of a solution feed line for delivering the polymer solution to the spinneret, a retention part for allowing the polymer solution to stay is provided, and a pressurizing unit for applying a pressure to the retained polymer solution and a temperature-adjusting unit for adjusting the temperature of the retained polymer solution (for example, a heating unit) are provided. The pressurizing unit is not particularly limited, but by disposing two or more pumps in the solution feed line, a pressure can be applied to any site therebetween. The pump includes a piston pump, a plunger pump, a diaphragm pump, a wing pump, a gear pump, a rotary pump, a screw pump, etc., and two or more kinds of pumps may be used.

Through this step, a pressure is applied under the conditions in which crystallization easily takes place, and therefore, it is presumed that crystal growth has anisotropy and in turn, not an isotropic spherical structure but a texture oriented in the longitudinal direction of the hollow fiber is developed, as a result, a columnar structure is obtained.

Here, the crystallization temperature Tc of the fluororesin-based polymer solution is defined as follows. In an apparatus for differential scanning calorimetry (DSC measurement), a mixture having the same composition as the composition of the membrane-forming polymer solution containing a fluororesin-based polymer, a solvent, etc. is sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min is Tc.

The cooling bath for cooling the fluororesin-based polymer solution discharged from the spinneret is described below. In the cooling bath, a mixed liquid including a poor or good solvent in a concentration of 50 to 95 wt % and a nonsolvent in a concentration of 5 to 50 wt % is preferably used. As the poor solvent, use of the same poor solvent as that in the polymer solution is preferably employed. For the hollow part-forming liquid, as with the cooling bath, a mixed liquid including a poor or good solvent in a concentration of 50 to 95 wt % and a nonsolvent in a concentration of 5 to 50 wt/t % is preferably used. As the poor solvent, use of the same poor solvent as that in the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy and can energetically stabilize and therefore be caused to preferentially occur over the growth in portions other than the narrowed portion, and intensive studies have been made on the method for enhancing the thickness uniformity.

As a result, it has been found that as the method for uptaking polymer into the narrowed portion and thereby promoting the texture growth, the thermally induced phase separation preferably includes at least one of the following cooling steps a) and b):

a) a step of soaking the membrane-forming solution in a cooling bath at a temperature Tb satisfying Tc−30° C.<Tb≤Tc; and b) a step of soaking the membrane-forming solution in a cooling bath at a temperature Tb1 satisfying Tb1≤Tc−30° C., followed by soaking in a cooling bath at a temperature Tb2 satisfying Tc−30° C.<Tb2≤Tc, (wherein Tc is the crystallization temperature of the membrane-forming solution containing a fluororesin-based polymer).

In the present invention, it has been found that as the method a), when cooling/solidification in a cooling bath is performed near the crystallization temperature of the polymer solution, the cooling/solidification slowly proceeds. In this case, denoting Tc as the crystallization temperature of the fluororesin-based polymer solution, the temperature Tb of the cooling bath is set to satisfy Tc−30° C.<Tb≤Tc, and Tc−20° C.<Tb≤Tc is more preferred.

The passing time in the cooling bath (i.e., soaking time in the cooling bath) is not particularly limited as long as enough time to complete the thermally induced phase separation including polymer uptake/growth into the narrowed portion can be ensured, and the passing time may be experimentally determined by taking into account the number of hollow-fiber membranes, the spinning speed, the bath ratio, the cooling capacity, etc.

However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, as the method b), two or more stages of cooling may be performed. Specifically, the cooling step may include a step of cooling the solution by using a first cooling bath for promoting generation/growth of a crystal nucleus by increasing the supercooling degree, and a step of thereafter cooling the solution by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of the phase separation.

In this case, when the temperature Tb1 of the first cooling bath for cooling the fluororesin polymer solution discharged from the spinneret satisfies Tb1≤Tc−30° C., the generation and growth of a crystal nucleus can be promoted by increasing the supercooling degree, and when the temperature Tb2 of the second cooling bath is set to a temperature near the crystallization temperature (specifically, set to satisfy Tc−30° C.<Tb2≤Tc, preferably Tc−20° C.<Tb2≤Tc), the polymer uptake/growth into the narrowed portion can be promoted. Tc is the crystallization temperature of the polymer solution.

The passing time in each cooling bath can be varied, but it is favorable to set, for example, the passing time in the first cooling bath to be from 1 to 20 seconds, preferably from 3 to 15 seconds, more preferably from 5 to 10 seconds, and set the passing time in the second cooling bath to be 10 seconds or more, preferably 20 seconds or more, more preferably 30 seconds or more.

When a texture having a thickness uniformity of less than 0.50 is referred to as "fibrous texture" so as to distinguish it from the columnar texture, the hollow-fiber membrane disclosed in JP-A-2006-297383 (Patent Document 5) is a hollow-fiber membrane having a fibrous texture. Such a porous hollow-fiber membrane having a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds starting from a void part at the time of stretching, the stretching itself is very difficult. This tendency is prominent in particular when the hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture described in Patent Document 5, it is considered that stress during stretching is dispersed by the fibrous texture oriented in the longitudinal direction and stretching can be performed. However, a great enhancement of the breaking strength is not achieved, and intensive studies on the cause thereof have revealed that a fibrous texture has many narrowed portions and because stress is concentrated at the narrowed portion during stretching and the narrowed portion is therefore preferentially stretched, the entire fibrous texture cannot be uniformly stretched, making it impossible to increase the stretch ratio.

In contrast, the present inventors have found that when the hollow fiber is a hollow fiber having a columnar texture with uniform thickness, the entire columnar texture can be uniformly stretched. Such uniform and high-ratio stretching has yielded success in stretching and orienting the molecular chain of the fluororesin-based polymer in the longitudinal direction of the porous hollow-fiber membrane and success in increasing the strength while maintaining high pure-water permeation performance.

<Stretching>

In the present invention, the hollow-fiber including a fluororesin-based polymer and having a columnar texture, obtained by the method above, is stretched at a low speed and high ratio, and the molecular chain of the polymer is thereby oriented in the longitudinal direction of the hollow-fiber membrane. As a result, a Raman orientation parameter v and an orientation degree in X-ray diffraction, each in the above-described range, are realized.

The stretch ratio is preferably from 1.8 to 2.4 times, more preferably from 1.9 to 2.3 times. When the stretch ratio is 1.8 times or more, the molecular chain can be sufficiently oriented by stretching and therefore, the strength of the hollow-fiber membrane can be increased. In addition, when the stretch ratio is 2.4 times or less, the pore size of the hollow-fiber membrane does not become too small, so that high water permeability can be realized and the elongation and toughness can be maintained.

In the present invention, the stretching speed is preferably from 1 to 150%/sec, more preferably from 3 to 100%/sec, still more preferably from 5 to 50%/sec. When the stretching speed is 1%/sec or more, the membrane can be stretched without extremely increasing the size of the stretching treatment equipment. In addition, when the stretching speed is 150%/sec or less, the membrane can be homogeneously stretched stably.

The hollow fiber having a columnar texture is stretched at the above-described low speed, and homogeneous stretching of the entire hollow fiber can thereby be achieved, as a result, homogeneous orientation can proceed. This homogeneous stretching is considered to include homogeneous stretching of the entirety of one columnar texture and stretching of a plurality of different columnar textures to the same extent.

As described above, the columnar texture is formed by uptaking the polymer into the narrowed portion of a solid matter that has been previously formed. Since the growth rate differs between the previously formed solid matter and the portion formed thereafter, the microscopic structure (for example, the number of molecular chain entanglements per volume) is considered to differ. Accordingly, the hollow fiber is preferably stretched at a low speed also for preventing breakage and achieving uniform stretching.

The stretching speed is calculated as follows.

Stretching speed (%/sec)=(stretch ratio×100−100) ÷stretching time (sec)

Here, the stretch ratio is calculated by "length (m) after stretching÷length (m) before stretching". For the stretching time, the time (sec) substantially used for stretching is employed. The stretch ratio may also be calculated from the set speed of the stretching apparatus, but it is better to dye the hollow-fiber membrane immediately before stretching to a length of 10 cm in its longitudinal direction, conduct stretching, and measure the length of the colored portion before and after the stretching. On this occasion, the time actually used for stretching can also be measured.

The stretching temperature is preferably from 60 to 140° C., more preferably from 70 to 120° C., still more preferably from 80 to 100° C. When stretching is performed in an atmosphere of 60° C. or more, the hollow fiber can be stably and homogeneously stretched. In addition, when the stretching temperature is 140° C. or less, the fluororesin-based polymer can be prevented from melting and can be stretched and oriented. Stretching in a liquid is preferred because of ease of temperature control, but the stretching may also be performed in a gas such as steam. As the liquid, water is simple and preferred, but in the case of stretching the hollow fiber at about 90° C. or more, use of a low-molecular-weight polyethylene glycol, etc. may also be preferably employed.

<Cross-Flow Filtration Method, Transmembrane Pressure Difference>

In the cross-flow filtration, a raw liquid flows in through the raw liquid inflow port 8 of the hollow-fiber membrane module 100, and the raw liquid is discharged from the raw liquid outlet 10. In addition, the filtered liquid is delivered to the upper part of the hollow-fiber membrane module 100 through the hollow part of the hollow-fiber membrane and discharged from the filtered liquid outlet 9.

As described above, in the cross-flow filtration, the raw liquid flows in parallel to the membrane surface. At this time, the membrane surface linear velocity may be appropriately set in accordance with the property of the raw liquid but is preferably from 0.3 to 5 m/s.

The filtration flux at the time of cross-flow filtration may be appropriately set in accordance with the property of the raw liquid but is preferably from 0.1 to 5.0 m³/m²/d, more preferably from 0.3 to 3.0 m³/m²/d.

In the filtration by a separation membrane, the clogging state of the separation membrane can be determined from the transmembrane pressure difference obtained by subtracting the pressure on the filtered liquid side from the pressure on the raw liquid side of the separation membrane, and in the case of dead-end filtration, the transmembrane pressure difference can be calculated using a manometer on the upstream side of the raw liquid inflow port 8 of the hollow-fiber membrane module 100 and a pressure on the downstream side of the filtered liquid outlet 9. If the filtration flux is the same, when clogging of the separation membrane is developed, the transmembrane pressure difference rises. However, in the case of cross-flow filtration, the pressure loss at the time of passing of raw liquid through the raw liquid-side passage of the hollow-fiber membrane module 100 is large, and the transmembrane pressure difference calculated by the above-described method also contains a pressure loss in the raw liquid-side passage and therefore, is difficult to appropriately calculate. Accordingly, denoting P1 as the filtered liquid-side pressure when filtration is stopped while feeding raw liquid to the raw liquid side of the hollow-fiber membrane module 100 and denoting P2 as the filtered liquid-side pressure when filtration is preformed while feeding raw liquid to the raw liquid side of the hollow-fiber membrane module 100, ΔP that is a value obtained by subtracting P2 from P1 may be used as the transmembrane pressure difference at the time of cross-flow filtration.

<Backwashing Method>

In the cross-flow filtration, backwashing can also be conducted by periodically stopping filtration. Backwashing is conducted to clean the membrane by feeding a backwashing solution from the filtered liquid outlet 9 of the hollow-fiber membrane module 100 and flowing the backwashing solution toward the outer side from the inner side of the hollow-fiber membrane. When the water permeability is recovered by backwashing, the filtration time can be extended, and the frequency of chemical cleaning decreases, so that the operation cost can be reduced. The backwashing can be conducted with the filtered liquid, or other liquid such as water may also be used.

The backwashing flux during backwashing may be appropriately set in accordance with the property of raw liquid or the clogging state of separation membrane but is preferably from 1.0 to 10.0 m³/m²/d, more preferably from 1.5 to 5.0 m³/m²/d. If the backwashing flux is less than 1.0 m³/m²/d, this is disadvantageous in that the cleaning effect is decreased. If the backwashing flux exceeds 10.0 m³/m²/d, this is disadvantageous in that the power cost increases and a large amount of solution needs to be used for backwashing.

<Air Scrubbing Method>

In air scrubbing, cleaning is effected by a shear stress due to air bubbles or shaking of the hollow-fiber membrane in the course of introducing compressed air through the raw liquid inflow port 8 of the hollow-fiber membrane module 100 and discharging the air from the raw liquid outlet 10. The air feed flow rate in air scrubbing varies depending on the area in a transverse cross-section of the hollow-fiber membrane module or the module length but is preferably from 70 to 400 m³/m²/hr per area in a transverse cross-section of the hollow-fiber membrane module.

Second Embodiment

The configuration of the hollow-fiber membrane module according to a second embodiment of the present invention is described by referring to the drawings. FIG. 1 is a schematic vertical cross-sectional diagram of the hollow-fiber membrane module according to the second embodiment of the present invention.

The hollow-fiber membrane module 100 illustrated in FIG. 1 includes a cylindrical case 3 being open at both ends, a large number of hollow-fiber membranes 1 housed in the cylindrical case 3, an upper cap 6 attached to the upper part of the cylindrical case 3, and a lower cap 7 attached to the lower part of the cylindrical case 3. Furthermore, the hollow-fiber membrane module 100 includes a first potting part 4, a second potting part 5, etc. Here, the "upper" and "lower" indicate the top and bottom in a posture when using the module 100 and correspond to the top and bottom of FIG. 1.

On a side surface of the cylindrical case 3, a raw liquid outlet 10 is provided near the upper end of the cylindrical case.

The large number of hollow-fiber membranes 1 are bundled to form a hollow-fiber membrane bundle 2. The filling ratio of the hollow-fiber membrane bundle 2 in the cylindrical case 3 is preferably from 41 to 80%. Details of the filling ratio are described later.

The first potting part 4 is also referred to as an upper potting part. The first potting part 4 is formed of an adhesive and liquid-tightly and airtightly bonds the upper-side end part (corresponding to the "first end part") of the hollow-fiber membrane bundle 2 to the cylindrical case 3 while letting an end face of the hollow-fiber membrane 1 be open. That is, the hollow-fiber membrane bundles 2 are bundled by the first potting part 4 and fixed to the inner wall of the cylindrical case 3.

The hollow-fiber membrane module 100 further includes a flow regulating cylinder 12. The flow regulating cylinder 12 is a tubular member disposed inside of the cylindrical case 3. The flow regulating cylinder 12 is disposed below the first potting part 4. The top and bottom of the flow regulating cylinder 12 are open, and an opening, such as a plurality of slits, is provided on a side surface. The flow regulating cylinder 12 can pass a liquid through the opening. The flow regulating cylinder 12 is provided on the periphery of the raw liquid outlet 10 with the purpose of preventing the treated raw liquid from channeling. For example, in the case of performing cross-flow filtration with a hollow-fiber membrane module without a flow regulating cylinder 12, the flow velocity of the raw liquid within the cylindrical case 3 is increased on the raw liquid outlet 10 side (left side of FIG. 1) and reduced on the side of a surface opposing the raw liquid outlet 10 (right side of FIG. 1) and therefore, the hollow-fiber membrane cleaning performance may be insufficient on the side of a surface opposing the raw liquid outlet 10 (right side of FIG. 1). When the flow regulating cylinder 12 is provided, channeling within the cylindrical case 3 is prevented, and the hollow-fiber membrane cleaning performance can thereby be enhanced.

The second potting part 5 is also referred to as a lower potting part. The second potting part 5 is formed of an adhesive and in the lower-side end part (corresponding to the "second end part") of the hollow-fiber membrane bundle 2, is bonded to the cylindrical case 3 while sealing the lower end face of the hollow-fiber membrane 1. More specifically, the second potting part 5 is disposed to face the first potting part 4 within the cylindrical case 3. Thus, in the lower part of the separation membrane module, the hollow part of the hollow-fiber membrane bundle 2 is sealed by an adhesive and is in a state incapable of opening. The hollow-fiber membrane bundles 2 are bundled by the second potting part 5 and fixed to the inner wall of the cylindrical case 3.

The second potting part 5 has a through hole 11 continuing from a surface opposing the first potting part 4 to the backward surface. The through hole 11 has a role as a raw liquid passage or an air passage at the time of air scrubbing. FIG. 2 is an A-A line cross-sectional view of the hollow-fiber membrane module 100 of FIG. 1 and illustrates an example of the arrangement of through holes 11 in the second potting part 5. In order to prevent a raw liquid channeling during cross-flow filtration or an air channeling during air scrubbing, the through holes 11 are preferably arranged evenly in the second potting part.

The upper cap 6 has a filtered liquid outlet 9. The upper cap 6 is liquid-tightly and airtightly attached to the upper part of the cylindrical case 3. The upper cap 6 is attachable/detachable relative to the upper part of the cylindrical case 3. The lower cap 7 has a raw liquid inflow port 8. The lower cap 7 is liquid-tightly and airtightly attached to the lower part of the cylindrical case 3. The lower cap 7 is attachable/detachable relative to the lower part of the cylindrical case 3.

The raw liquid flows into the hollow-fiber membrane module 100 through the raw liquid inflow port 8 of the lower cap 7, and a raw liquid having not passed through the hollow-fiber membrane 1 is discharged from the raw liquid outlet 10 to the outside of the hollow-fiber membrane module 100. A filtered liquid having passed through the hollow-fiber membrane 1 is discharged from the filtered liquid outlet 9 of the upper cap 6 to the outside of the hollow-fiber membrane module 100. A system of filtering a raw liquid in this way while flowing it in parallel to the membrane surface is referred to as cross-flow filtration and has an effect of preventing suspended substances, etc. in the raw liquid from depositing on the membrane surface or an effect of preventing components contained in the raw liquid from causing concentration polarization on the membrane surface. In addition, a system of, as in FIG. 1, feeding a raw liquid to the outer side of the hollow-fiber membrane and performing filtration from the outer side to the inner side is referred to as an external pressure system. Conversely, a system of performing filtration from the inner side to the outer side of the hollow-fiber membrane is referred to as an internal pressure system.

In the case of performing cross-flow filtration, when the membrane surface linear velocity of raw liquid is increased, the shear stress acting on the membrane surface increases, and the cleaning performance is enhanced. In the cross-flow filtration, a raw liquid flows in through the raw liquid inflow port 8 of the hollow-fiber membrane module 100, and the raw liquid is discharged from the raw liquid outlet 10. In addition, the filtered liquid is delivered to the upper part of the hollow-fiber membrane module 100 through the hollow part of the hollow-fiber membrane and discharged from the filtered liquid outlet 9. The membrane surface linear velocity of cross-flow filtration is preferably from 0.3 to 5 m/s, but if the membrane surface linear velocity is increased, the stress acting on the hollow-fiber membrane increases and therefore, the hollow-fiber membrane may be broken. Above all, in the case of an external pressure-type hollow-fiber membrane module 100 illustrated in FIG. 1, the raw liquid flows out from the raw liquid outlet 10 provided on a side surface of the cylindrical case 3 and therefore, a raw liquid flow in a direction perpendicular to the long axis direction of the hollow-fiber membrane is generated near the raw liquid outlet 10, as a result, a drag force on the hollow-fiber membrane is produced. The drag force is proportional to the square of the flow velocity and therefore, when the membrane surface linear velocity of cross-flow filtration is increased, a large drag force may be produced on the hollow-fiber membrane around the raw liquid outlet 10 to cause breakage of the hollow-fiber membrane. In order to prevent breakage of the hollow-fiber membrane during cross-flow filtration, the breaking strength of the hollow-fiber membrane is preferably 25 MPa or more, more preferably 27 MPa or more.

Incidentally, a smaller diameter of the hollow-fiber membrane leads to an increase in the specific surface area and is advantageous in view of membrane area but poses a problem that the pressure loss at the time of passing of liquid in the hollow part increases. Accordingly, the inside diameter of the hollow-fiber membrane is preferably 0.5 mm or more. In addition, in order to increase the specific surface area of the hollow-fiber membrane, the outside diameter of the hollow-fiber membrane is preferably 3.0 mm or less. On the other hand, in the external pressure-type hollow-fiber membrane module, if the transmembrane pressure difference is high, the hollow-fiber membrane may be buckled. As the outside diameter/inside diameter ratio of the hollow-fiber membrane is larger, the pressure resistance is increased and buckling is less likely to occur. For this reason, the outside diameter/inside diameter ratio is preferably 1.5 or more.

In the cross-flow filtration, the membrane surface is cleaned by a raw liquid stream flowing in parallel to the membrane surface, but with the same average linear velocity of raw liquid within the hollow-fiber membrane module, as the distance between hollow-fiber membranes is smaller, the shear stress acting on the membrane surface is higher, and the membrane surface cleaning effect increases. In order to increase the cleaning effect during cross-flow filtration by reducing the inter-membrane distance between hollow-fiber membranes, the filling ratio of the hollow-fiber membrane within the hollow-fiber membrane module is preferably from 41 to 80%, more preferably from 50 to 70%. When the filling ratio of the hollow-fiber membrane is 41% or more, the distance between membranes is reduced, making it possible to increase the cleaning efficiency at the time of cross-flow filtration and prevent a rise in the transmembrane pressure difference. In addition, as the filling ratio of the hollow-fiber membrane is higher, the membrane surface linear velocity can be increased with the same flow rate of raw liquid and thus cleaning effect can be enhanced. Meanwhile, when the filling ratio of the hollow-fiber membrane is 80% or less, the hollow-fiber membrane is easily fixed by the potting part.

The filling ratio of the hollow-fiber membrane as used herein indicates the proportion of the area occupied by a hollow-fiber membrane portion in a transverse cross-section (in FIG. 1, a plane parallel to the horizontal direction and perpendicular to the paper plane) of the cylindrical case 3 of the hollow-fiber membrane module between the first potting part and the second potting part. Denoting S1 as the cross-sectional area of a hollow-fiber membrane existing portion on the inner side of the cylindrical case 3 and S2 as the total cross-sectional area of the hollow-fiber membrane, the filling ratio of the hollow-fiber membrane can be represented by the following formula (3). Here, in the case where a member other than the hollow-fiber membrane, such as flow regulating cylinder 12, is present, the cross-sectional area obtained by subtracting the cross-sectional area of the member other than the hollow-fiber membrane from the cross-sectional area on the inner side of the cylindrical case 3 is denoted by S. In addition, the nozzle portion on a side surface of the cylindrical case 3, which is provided as the raw liquid outlet 10, is also not included in the cross-sectional area S. When an inner-side member such as flow regulating cylinder 12, a reduced diameter part or an expanded diameter part is present in the cylindrical case 3, the cross-sectional area S is changed in that portion. In the present invention, with respect to the space between the second potting part-side interface of the first potting part of the hollow-fiber membrane module and the first potting-side interface of the second potting part, the cross-sectional area S is calculated for 10 sites at regular intervals and denoting the average value thereof as the cross-sectional area S1 of the hollow-fiber membrane existing portion, the filling ratio of the hollow-fiber membrane is calculated according to the following formula (3):

$$\text{Filling ratio [\%] of hollow-fiber membrane} = S2/S1 \times 100 \qquad (3)$$

Here, the total cross-sectional area S2 of the hollow-fiber membrane can be represented by the following formula (4). With respect to 10 hollow-fiber membranes in the hollow-fiber membrane module, the outside diameter is measured for every two directions of longest direction and shortest direction, and the average value of measured values of a total of 20 sites is designated as the outside diameter R of the hollow-fiber membrane. Using the outside diameter R and assuming the hollow-fiber membrane is a perfect circle, the total cross-sectional area S2 of the hollow-fiber membrane is calculated according to formula (4):

$$S2 = [\text{circular constant}] \times [\text{outside diameter } R \text{ of hollow-fiber membrane}/2]^2 \times [\text{number of hollow-fiber membranes within hollow-fiber membrane module}] \qquad (4)$$

The above-described average linear velocity of raw liquid within the hollow-fiber membrane module can be represented by the following formula (5):

$$\text{Average linear velocity [m/s]} = \text{flow rate of raw liquid } [m^3/s]/(S1-S2)[m^2] \qquad (5)$$

<Potting Method of Hollow-Fiber Membrane Module>

Bundling hollow-fiber membranes with an adhesive is referred to as potting. The method for potting includes, as representative methods, a centrifugal potting method in which a liquid adhesive is infiltrated among hollow fiber membranes by utilizing centrifugal force and then cured; and a static potting method in which a liquid adhesive is fed by a metering pump or head, allowed to naturally flow and thereby infiltrate among hollow fiber membranes 1, and then cured. In the centrifugal potting method, an adhesive readily infiltrates among hollow fiber membranes due to centrifugal force, and even a high-viscosity adhesive can be used.

<Material of Hollow-Fiber Membrane>

The material for the hollow-fiber membrane of the hollow-fiber membrane module of the present invention is not particularly limited, but a hollow-fiber membrane containing, for example, a fluororesin-based polymer may be used.

The fluororesin-based polymer as used in the present description means a resin containing at least one of a vinylidene fluoride homopolymer and a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer and other fluorine-based monomer, etc. Such a copolymer includes, for example, a copolymer of vinylidene fluoride and one or more kinds of monomers selected from vinyl fluoride, tetrafluoroethylene, hexafluoropropylene and chlorotrifluoroethylene.

In addition, a monomer other than the above-described fluorine-based monomer, such as ethylene, may be copolymerized to the extent not impairing the effects of the present invention.

The weight average molecular weight of the fluororesin-based polymer may be appropriately selected according to the strength and water permeation performance required for the polymer separation membrane, but as the weight average molecular weight is larger, the water permeation performance is decreased, and as the weight average molecular weight is smaller, the strength is decreased. For this reason, the weight average molecular weight is preferably from 50,000 to 1,000,000. In the case of a water treatment application where the polymer separation membrane is subject to chemical cleaning, the weight average molecular weight is preferably from 100,000 to 700,000, more preferably from 150,000 to 600,000.

The hollow-fiber membrane preferably contains the fluororesin-based polymer as a main component, and the proportion of the fluororesin-based polymer in the hollow-fiber membrane is preferably 80 wt % or more, more preferably 90 wt % or more, still more preferably 95 wt % or more. The hollow-fiber membrane may be composed of only the fluororesin-based polymer.

Here, the "hollow-fiber membrane containing the fluororesin-based polymer as a main component" can be interchanged with the "hollow-fiber membrane based on the fluororesin-based polymer". In the present description, other elements are also described by the phrase "X contains Y as a main component", and this can similarly be interchanged with "X is based on Y".

<Orientation of Molecular Chain>

In the hollow-fiber membrane of the present invention, at least part of the molecular chain of the fluororesin-based polymer is oriented in the longitudinal direction of the hollow-fiber membrane, and the orientation degree π is 0.4 or more and less than 1.0. The orientation degree t is calculated from a half-width H (°) obtained by wide-angle X-ray diffraction measurement, based on the following formula (2):

$$\text{Orientation degree } \pi = (180° - H)/180° \quad (2)$$

(wherein H is a half-width (°) of the diffraction intensity distribution in the circumferential direction of a wide-angle X-ray diffraction image).

The orientation of the molecular chain in the longitudinal direction of the hollow-fiber membrane and the method for measuring the orientation degree r thereof are specifically described below.

In order to calculate the orientation degree π, the hollow-fiber membrane is fixed to a fiber sample stage by arranging its longitudinal direction to run vertically. Here, the short-side direction of the hollow-fiber membrane is a direction parallel to the diameter direction of the hollow fiber, and the longitudinal direction is a direction perpendicular to the short-side direction.

When X-ray diffraction is performed, an annular diffraction image called a Debye-Scherrer ring is obtained. In the case of a non-oriented sample, a great change is not observed in the diffraction intensity along the Debye-Scherrer ring, but in the case of an oriented sample, the intensity distribution is deviated on the Debye-Scherrer ring. Accordingly, the orientation degree can be calculated from this intensity distribution based on formula (2).

More specifically, in the case where the molecular chain is non-oriented, when 2θ/θ scanning is performed in the short-side direction (i.e., when a diffraction pattern showing a diffraction intensity distribution in the diameter direction of Debye-Scherrer ring is obtained), a peak is observed at a position around the diffraction angle 2θ=20°. The abscissa axis of the diffraction pattern obtained here is the diffraction angle 2θ of X-ray, and the ordinate axis is the diffraction intensity. Furthermore, when the sample is scanned in the azimuth angle β direction by fixing the diffraction angle 2θ to the peak position above, i.e., around 20°, a diffraction pattern in which the abscissa axis shows the azimuth angle β and the ordinate axis shows the diffraction intensity (i.e., a diffraction intensity distribution along the circumferential direction of Debye-Scherrer ring at the position of diffraction angle 2θ=20°) is obtained. In the case of a non-oriented sample, the diffraction intensity is substantially constant throughout 360° in the circumferential direction of Debye-Scherrer ring.

Figure 7:
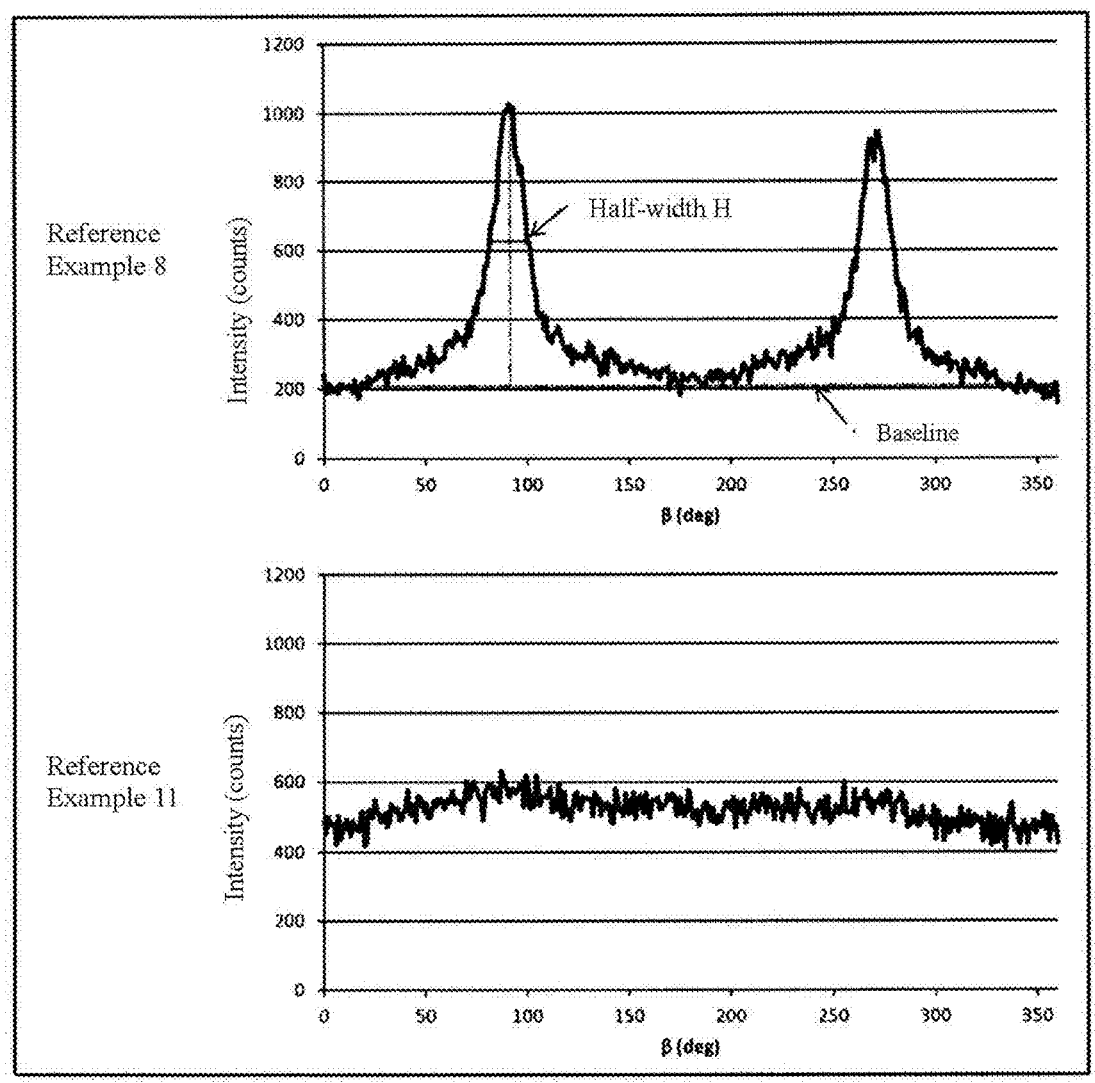
FIG. 7 is a diagram illustrating the intensity distribution in the azimuth angle direction at 2θ=20.4° of each of the hollow-fiber membranes of Reference Example 8 and Reference Example 11.

On the other hand, in the case where the molecular chain is oriented in the longitudinal direction of the hollow-fiber membrane, a strong diffraction intensity is observed on the azimuth angle corresponding to the short-side direction of the hollow-fiber membrane (i.e., on the equatorial line) on the Debye-Scherrer ring around 2θ=20°, and a small diffraction intensity is obtained in other portions. More specifically, in the case of an oriented sample, the diffraction intensity distribution in the diameter direction of Debye-Scherrer ring shows a diffraction peak around 2θ=20°, similarly to a non-oriented sample, and the distribution in the circumferential direction shows, unlike a non-oriented sample, a diffraction peak on the azimuth angle corresponding to the short-side direction of the hollow-fiber membrane. For example, FIG. 7 is a diagram illustrating the intensity distribution in the azimuth angle direction at 2θ=20.4° of the hollow-fiber membrane of Example 11 (Reference Example 8), and in this diagram, a peak is observed around β=90° and 270°.

In the description above, the position of diffraction peak in the diameter direction of Debye-Scherrer ring (i.e., the value of 2θ corresponding to the diffraction peak) is "around 20°". However, the value of 2θ differs depending on the structure or blending of polymer and may range from 15 to 25°. For example, when X-ray diffraction is performed for a polyvinylidene fluoride homopolymer having an α crystal or β crystal, a diffraction peak derived from a (110) plane of α crystal or β crystal, i.e., a plane parallel to molecular chain, is observed around 2θ=20.4°.

As described above, the intensity distribution in the azimuth angle direction is obtained by fixing the value of diffraction angle 2θ and furthermore, measuring the intensity in the range from 0° up to 360° in the azimuth angle direction (circumferential direction). This intensity distribution may also be said to be an intensity distribution obtained by scanning a crystal peak on a diffraction image in the circumferential direction. Here, when the ratio between the intensity at an azimuth angle of 180° (longitudinal direction) and the intensity at an azimuth angle of 90° (short-side direction) is 0.80 or less or 1.25 or more, it is regarded that a peak is present, and using the intensity distribution in this azimuth angle direction, the width at a position of half the peak height (half-width H) is determined.

The orientation degree π is calculated by substituting the half-width H into formula (2).

In the hollow-fiber membrane of the present invention, the orientation degree π of the molecular chain in the longitudinal direction of the hollow-fiber membrane is 0.4 or more and less than 1.0, preferably 0.5 or more and less than 1.0, more preferably 0.6 or more and less than 1.0. When the orientation degree π is 0.4 or more, the mechanical strength of the hollow-fiber membrane is increased. Incidentally, when wide-angle X-ray diffraction measurement is performed at measurement points at intervals of 1 cm in the longitudinal direction of the hollow-fiber membrane, it is preferred that at 80% or more of the measurement points, the orientation degree π is 0.4 or more and less than 1.0.

In the intensity distribution obtained by scanning a crystal peak in the circumferential direction, when the ratio between the intensity at an azimuth angle of 180° and the intensity at an azimuth angle of 90° is more than 0.80 and less than 1.25, it is regarded that a peak is absent. That is, in this case, the fluororesin-based polymer is determined to be non-oriented.

In the case where the hollow-fiber membrane contains an α crystal or β crystal of polyvinylidene fluoride, the half-width H is preferably determined from an intensity distribution obtained by circumferentially scanning a crystal peak (2θ=20.4°) derived from a (110) plane of the α crystal or β crystal of polyvinylidene fluoride in wide-angle X-ray diffraction measurement.

The orientation of the molecular chain in the hollow-fiber membrane can also be determined by orientation analysis according to Raman spectroscopy. First, a hollow-fiber membrane is sliced by cutting with a microtome from a cross-section along the longitudinal direction of the hollow-fiber membrane. The thus-obtained section is observed under an optical microscope, and laser Raman measurement is thereby performed at 1 μm intervals along the longitudinal direction of a columnar texture while checking the columnar texture. The number of measurement points in one columnar texture is a value obtained by dividing the longitudinal length (μm) of the later-described columnar texture by 1 μm (rounded down to the nearest integer). For example, when the longitudinal length of the columnar texture is 20.5 μm, the number of measurement points is 20.

For example, in the case where the fluororesin-based polymer is a polyvinylidene fluoride homopolymer, the Raman band around 1,270 cm$^{-1}$ is assigned to a coupling mode of CF$_2$ (fluorocarbon) stretching vibration and CC (carbon-carbon) stretching vibration. The vibration direction of these vibrations is in a mode parallel to molecular chain. Meanwhile, the vibration direction of the Raman band around 840 cm$^{-1}$ is perpendicular to molecular chain. Since strong Raman scattering is obtained when the vibration direction of molecular chain coincides with the polarization direction of incident light, the scattering intensity ratio of these vibration modes is changed in correlation with the orientation degree.

The Raman orientation parameter can therefore be calculated according to the following formula (1). The Raman orientation parameter shows a larger value as the orientation in the longitudinal direction of the hollow-fiber membrane is higher, shows a value of 1 when non-oriented, and shows a value smaller than 1 when the orientation in the short-side direction is high.

$$\text{Raman orientation parameter} = (I1270/I840)\text{parallel}/(I1270/I840)\text{perpendicular} \quad (1)$$

In formula (1),
parallel condition: the longitudinal direction of the hollow-fiber membrane is parallel to the polarization direction,
perpendicular condition: the longitudinal direction of the hollow-fiber membrane is orthogonal to the polarization direction,
I1270 parallel: the intensity of Raman band at 1,270 cm$^{-1}$ under parallel condition,
I1270 perpendicular: the intensity of Raman band at 1,270 cm$^{-1}$ under perpendicular condition,
I840 parallel: the intensity of Raman band at 840 cm$^{-1}$ under parallel condition, and
I840 perpendicular: the intensity of Raman band at 840 cm$^{-1}$ under perpendicular condition.

In one hollow-fiber membrane, 10 columnar textures different from each other, having a length of 0.5 to 1.5 times the representative value of the longitudinal length of the later-described columnar texture, are selected. With respect to each columnar texture, laser Raman measurement is performed, and the Raman orientation parameters of respective measurement points are calculated according to formula (1). An average value of the obtained values is defined as the Raman orientation parameter ν. In addition, an operation of selecting a largest Raman orientation parameter and a smallest Raman orientation parameter among the measurement points of one columnar texture is performed for 10 columnar textures different from each other. With respect to selected 10 largest Raman orientation parameters and 10 smallest Raman orientation parameters, respective average values are determined and taken as a maximum Raman orientation parameter M and a minimum Raman orientation parameter m, and M/m is calculated. In order to accurately obtain the Raman orientation parameter ν, maximum Raman orientation parameter M, minimum Raman orientation parameter m and M/m, the measurement is preferably performed for 20 columnar textures different from each other.

In the hollow-fiber membrane of the present invention, the Raman orientation parameter ν of the molecular chain in the longitudinal direction of the hollow-fiber membrane is preferably 3.0 or more, more preferably 3.4 or more, still more preferably 3.7 or more. When the Raman orientation parameter ν is 3.0 or more, the strength of the hollow-fiber membrane is increased.

It is considered that the maximum Raman orientation parameter M and the minimum Raman orientation parameter m indicate respectively a main orientation site in the columnar texture and a point of effort during stretching. Accordingly, M and m may be set to appropriate ranges by taking into account a balance of performances of the obtained hollow-fiber membrane, such as strength, elongation and water permeability. M/m is preferably larger because of a tendency that orientation of the molecular chain develops and the strength of the hollow-fiber membrane increases. For this reason, in the present invention, M/m is preferably 3 or more, more preferably 4 or more, still more preferably 5 or more.

There is a tendency that the orientation degree π determined by wide-angle X-ray diffraction measurement represents the orientation of molecular chain of the entire porous hollow-fiber membrane and the Raman orientation parameter ν determined by Raman spectroscopy represents the orientation of molecular chain when focus is directed onto the columnar texture of the porous hollow-fiber membrane, i.e., the orientation of local molecular chain. When both the entire and local molecular chains of the porous hollow-fiber membrane are strongly oriented, the strength of the hollow-fiber membrane increases. For this reason, it is preferred that the orientation degree π is 0.6 or more and less than 1.0 and the Raman orientation parameter ν is 3.4 or more, and it is more preferred that the orientation degree π is 0.7 or more and less than 1.0 and the Raman orientation parameter ν is 3.7 or more.

As a specific configuration, in the hollow-fiber membrane, the molecular chain of the fluororesin-based polymer is preferably oriented in the longitudinal direction of the hollow-fiber membrane.

<Columnar Texture>
(a) Dimension

The hollow-fiber membrane has a columnar texture oriented in the longitudinal direction of the hollow-fiber membrane. The "columnar texture" is a solid material having a uniform thickness and having a shape long in one direction. The aspect ratio (longitudinal length/short-side length) of the columnar texture is preferably 3 or more.

Here, the "longitudinal length" indicates a length in the longitudinal direction of the columnar texture. The "short-side length" is an average length in the short-side direction of the columnar texture. Furthermore, "oriented in the longitudinal direction" means that out of angles between the longitudinal direction of the columnar texture and the longitudinal direction of the hollow-fiber membrane, the acute angle is within 20°.

The longitudinal length and short-side length can be measured as follows. A hollow-fiber membrane is cut along the longitudinal direction of the hollow-fiber membrane, and the obtained cross-section is observed using a scanning electron microscope (SEM). The magnification is variable according to the length of the columnar texture and is set to a level allowing a visual field to include the entire figure of each of 5, preferably 10, columnar textures over its longitudinal direction. In the case where the length in the longitudinal direction length varies in one columnar texture, a maximum length in the longitudinal direction may be measured as the longitudinal length. The short-side length is determined by measuring the length in each short-side direction at a predetermined number of arbitrary measurement points in one columnar texture and calculating an average value thereof. The number of measurement points is a value obtained by dividing the longitudinal length (m) by 1 µm (rounded down to the nearest integer). For example, when the longitudinal length of the columnar texture is 20.5 µm, the number of measurement points is 20. In this connection, when the value becomes 21 or more, the length may be measured at arbitrary 20 points.

The longitudinal length of the columnar texture is not particularly limited but is preferably 7 µm or more, more preferably 10 µm or more, still more preferably 15 µm or more. The longitudinal length of the columnar texture is, for example, preferably 50 µm or less, more preferably 40 µm or less.

In the present invention, the short-side length of the columnar texture is preferably from 0.5 to 3 µm. The short-side length is preferably in the range above, because high strength performance and high pure-water permeation performance are obtained. When the short-side length of the columnar texture is 0.5 µm or more, physical strength of the columnar texture itself is increased and therefore, high strength is obtained. When the short-side length of the columnar texture is 3 µm or less, the void among columnar textures becomes large and in turn, good pure-water permeation performance is obtained. The short-side length of the columnar texture is more preferably from 0.7 to 2.5 µm, still more preferably from 1 to 2 µm.

In the hollow-fiber membrane of the present invention, preferable ranges of representative values of the longitudinal length and short-side length of the columnar texture are respectively the same as the above-described preferable ranges of the longitudinal length and short-side length of each individual columnar texture. In addition, as for the effects due to each representative value being in that range, description of effects when individual columnar textures have a dimension in that range is applied.

The representative value of the longitudinal length is measured as follows. Similarly to the measurement of the longitudinal length, the longitudinal length is measured at 3 sites, preferably 5 sites, in the hollow-fiber membrane for 5, preferably 10, columnar textures per site. With respect to the obtained values of the longitudinal length, an average value is determined and can be used as the representative value of the longitudinal length of the columnar texture.

The representative value of the short-side length is determined by measuring the short-side length (calculated as an average value) as described above for columnar textures which were subject to measurement of the representative value of the longitudinal length, and calculating an average value thereof.

In the hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, yet still more preferably 20 or more.

In the present invention, it is preferred that the short-side length of the columnar texture is from 0.5 to 3 µm and the aspect ratio of the columnar texture is 3 or more. Incidentally, the upper limit of the aspect ratio is not particularly limited but may be, for example, 50 in consideration of the existing production method, etc. of the hollow-fiber membrane.

(b) Thickness Uniformity

As described later, the hollow-fiber membrane of the present invention can be produced by forming a hollow fiber from a membrane-forming solution containing a polymer, and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.60 or more, more preferably 0.70 or more, still more preferably 0.80 or more, yet still more preferably 0.90 or more. Although the thickness uniformity is 1.0 at a maximum, the columnar texture may have a thickness uniformity of less than 1.0.

In the hollow-fiber membrane, the columnar texture has a high thickness uniformity in this way, i.e., a narrowed portion is little formed in the columnar texture, and the elongation of the hollow-fiber membrane is thereby increased.

When the hollow-fiber membrane after stretching keeps high elongation, this is advantageous in that fiber breakage is less likely to occur even when a load is abruptly applied. The elongation at break of the hollow-fiber membrane is preferably 50% or more, more preferably 80% or more. The upper limit of the elongation at break of the hollow-fiber membrane is not particularly limited but is, for example, 500% in consideration of the thickness uniformity above.

The thickness uniformity is described below. As the length variation among respective short-side directions of the columnar texture is smaller, a narrowed portion is less formed in the columnar texture, resulting in high thickness uniformity, and the columnar texture comes close to a perfect column.

The thickness uniformity of the columnar texture is determined by comparing a first cross-section and a second cross-section each running in parallel to the short-side direction of the hollow-fiber membrane. This is specifically described below.

At the beginning, a first cross-section and a second cross-section running in parallel to each other are selected. The distance between the first cross-section and the second cross section is set to be 5 μm. First, a portion composed of resin and a void portion are distinguished in each cross-section, and the area of resin portion and the area of void portion are measured. Next, the area of a portion where when the first cross-section is projected onto the second cross-section, the portion composed of resin in the first cross-section and the portion composed of resin in the second cross-section are overlapped, namely, the overlap area, is determined. With respect to arbitrary 20 pairs of first cross-section and second cross-section in one hollow-fiber membrane, thickness uniformities A and B are determined based on the following formulae (6) and (7), respectively:

Thickness uniformity $A$=(overlap area)/(area of resin portion of second cross-section) (6)

Thickness uniformity $B$=(overlap area)/(area of resin portion of first cross-section) (7)

That is, 20 pairs of thickness uniformities A and B are obtained for one hollow-fiber membrane. A larger value means that the thickness of the columnar texture is more uniform. Then, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane have a value of 0.60 or more, the hollow-fiber membrane can be said to have the columnar texture.

In measuring the thickness uniformity, in order to clearly distinguish the resin portion and the void portion, it is preferable to previously perform resin-embedding of the hollow-fiber membrane in an epoxy resin, etc. and staining treatment of the epoxy resin, etc. with, for example, osmium. By such resin embedding/staining treatment, the void portion is filled with an epoxy resin, etc., and at the time of the later-described cross-sectional processing with a focused ion beam, the portion composed of a fluororesin-based polymer and the void portion (i.e., the epoxy resin portion) can be clearly distinguished, as a result, high observation accuracy is obtained.

Furthermore, in order to obtain the above-described first cross-section and second cross-section each running in parallel to the short-side direction of the hollow-fiber membrane, a scanning electron microscope (SEM) equipped with a focused ion beam (FIB) is preferably used. A face parallel to the short-side direction of the hollow-fiber membrane is cut out using FIB, and FIB cutting and SEM observation are repeatedly conducted 200 times at 50 nm intervals toward the longitudinal direction of the hollow-fiber membrane. By such continuous cross-sectional observation, information at a depth of 10 μm can be obtained. Arbitrary first and second cross-sections forming faces running in parallel to each other and being spaced 5 μm apart are selected therefrom, and the thickness uniformities can be determined using formulae (6) and (7). The observation magnification may be sufficient if it is a magnification enabling clear identification of a columnar texture and a spherical texture, and a magnification of, for example, from 1,000 to 5.000 times may be used.

(c) Composition

The columnar texture preferably contains the fluororesin-based polymer as a main component, and the proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the hollow-fiber membrane has a solid matter containing a fluororesin-based polymer, and at least part of the solid matter constitutes a columnar texture. All of solid matters containing a fluororesin-based polymer may constitute a columnar texture, or part thereof may have a shape not falling under a columnar texture. In the hollow-fiber membrane, out of solid matters containing a fluororesin-based polymer, the proportion of the solid matter constituting a columnar texture is preferably 80 wt % or more, more preferably 90 w % or more, still more preferably 95 wt % or more.

(d) Columnar Texture in Hollow-Fiber Membrane

In the hollow-fiber membrane, the principal structure is preferably a columnar texture. The proportion of the columnar texture in the hollow-fiber membrane is preferably 80 wt % or more, more preferably 90 wt % or more, still more preferably 95 wt % or more. The hollow-fiber membrane may be composed of only a columnar texture.

More specifically, the hollow-fiber membrane preferably has, as the principal structure, a columnar texture containing a fluororesin-based polymer as a main component. The hollow-fiber membrane can also be phrased as an assembly of columnar textures.

<Porosity>

In the hollow-fiber membrane of the present invention, in order to satisfy both high pure-water permeation performance and high strength, the porosity is preferably from 41 to 90%, more preferably from 50 to 80%, still more preferably from 50 to 70%. If the porosity is less than 41%, the pure-water permeation performance is reduced, whereas if it exceeds 90%, the strength significantly decreases and therefore, the membrane lacks suitability as a hollow-fiber membrane for water treatment. The porosity of the hollow-fiber membrane is determined according to the following formula (8) by using the area of resin portion and the area of void portion in the above-described cross-section. In order to increase the accuracy, it is preferable to determine the porosity for arbitrary 20 or more, preferably 30 or more, cross-sections and use an average value thereof.

Porosity (%)={100×(area of void portion)}/{(area of resin portion)+(area of void portion)} (8)

<Others>

The hollow-fiber membrane of the present invention may contain a texture other than the above-described columnar texture to the extent not departing from the object of the present invention. The structure other than the columnar texture includes, for example, a spherical texture having an aspect ratio (longitudinal length/short-side length) of less than 3. The short-side length and longitudinal length of the spherical texture are preferably from 0.5 to 3 μm. In the case of using a spherical texture, as long as the short-side length and longitudinal length thereof are in the range above, reduction in the strength of the hollow-fiber membrane can be prevented, and good pure-water permeation performance can be maintained.

However, if the proportion of such a spherical texture having an aspect ratio of less than 3 in the hollow-fiber membrane is increased, there arises a tendency that spherical textures are increasingly coupled with each other to increase the narrowed portion and it is difficult to perform high-ratio stretching or keep the elongation after stretching. For this reason, a smaller proportion of the spherical texture in the hollow-fiber membrane is more preferred, and the proportion is preferably less than 20%, more preferably less than 10%, still more preferably less than 1%, i.e., almost nil. It is most preferred that the spherical texture is not present at all.

Here, the occupancy (%) of each texture is determined according to the following formula (9) after taking a photograph of a cross-section in the longitudinal direction of the hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture})/(\text{area of entire photograph})\} \times 100 \qquad (9)$$

Incidentally, the area of the entire photograph and the area occupied by a texture can be determined preferably by employing, for example, a method of converting the area into a weight corresponding to each texture photographed. That is, the photograph taken may be printed on paper, and the weight of paper corresponding to the entire photograph and the weight of paper corresponding to a texture portion cut out therefrom may be measured. In addition, before taking a photograph by SEM, etc., the above-described resin embedding/staining treatment and FIB cutting are preferably applied, because the observation accuracy increases.

The hollow-fiber membrane of the present invention may be a membrane in which a layer having the above-described columnar texture and a layer having other structure are stacked to the extent not departing from the object of the present invention. However, if the thickness of the layer having other structure is large compared with the layer having the columnar texture, the object and effects of the present invention can hardly be exerted and therefore, the ratio of the thickness of the layer having other structure to the thickness of the layer having the columnar texture is preferably 0.3 or less, more preferably 0.2 or less.

<Production Method of Hollow-Fiber Membrane>

The method for producing the hollow-fiber membrane of the present invention is described below by way of example. The method for producing a hollow-fiber membrane includes at least:

1) a step of forming a hollow fiber having a columnar texture from a membrane-forming solution containing a fluororesin-based polymer by thermally induced phase separation, in which the columnar texture is oriented in the longitudinal direction and has a thickness uniformity of 0.60 or more and less than 1.00: and 2) a step of stretching the porous hollow fiber obtained in 1) above to 2.0 to 5.0 times in the longitudinal direction.

(a) Preparation of Membrane-Forming Solution

The production method of the porous hollow-fiber membrane in the present invention further includes a step of preparing a fluororesin-based polymer solution. A fluororesin-based polymer solution (i.e., a membrane-forming solution containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming solution is high, a hollow-fiber membrane having high strength is obtained. On the other hand, when the polymer concentration is low, the porosity of the hollow-fiber membrane is increased, and the pure-water permeation performance is enhanced. Accordingly, the concentration of the fluororesin-based polymer is preferably from 20 to 60 wt %, more preferably from 30 to 50 wt %.

In the present invention, the poor solvent is a solvent in which the fluororesin-based polymer cannot be dissolved to a concentration of 5 wt % or more at a low temperature of 60° C. or less but can be dissolved to a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved to a concentration of 5 wt % or more even in a low-temperature region of 60° C. or less. The nonsolvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes cyclohexanone, isophorone, γ-butyrolactone, methyl isoamyl ketone, propylene carbonate, dimethylsulfoxide, etc., and a mixed solvent thereof. The good solvent includes N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof. The nonsolvent includes water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, a mixed solvent thereof, etc.

(b) Formation of Hollow Fiber

In the hollow fiber forming step, a hollow fiber is obtained from a membrane-forming solution containing a fluororesin-based polymer by utilizing a thermally induced phase separation method of inducing phase separation by temperature change. In order to perform the later-described high-ratio stretching of 2.0 times or more, it is preferred that the hollow fiber has a columnar texture oriented in its longitudinal direction and the thickness uniformity of the columnar texture is 0.60 or more and less than 1.00. The lower limit of the thickness uniformity of the columnar texture is more preferably 0.70 or more, still more preferably 0.80 or more, yet still more preferably 0.90 or more.

In the thermally induced phase separation method, two kinds of phase separation mechanisms are mainly utilized. One is a liquid-liquid phase separation method in which a polymer solution dissolved uniformly at a high temperature is separated into a polymer-rich phase and a polymer-poor phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow fiber membrane. This is because the polymer-rich phase forms a very fine phase by phase separation before the structure is fixed, and cannot be made columnar.

As a specific method, a hollow part-forming liquid is discharged through an inner tube of a double tube-type spinneret for spinning of a hollow-fiber membrane while discharging the above-described membrane-forming solution through an outer tube of the double tube-type spinneret. The thus-discharged membrane-forming solution is cooled and solidified in a cooling bath to obtain a hollow-fiber membrane.

The fluororesin-based polymer solution is, before being discharged from the spinneret, held in a specific temperature condition for a given time under pressure. The pressure is preferably 0.5 MPa or more, more preferably 1.0 MPa or more. The temperature T of the polymer solution preferably satisfies $Tc+35°$ C.$\leq T \leq Tc+60°$ C., more preferably satisfies $Tc+40°$ C.$\leq T \leq Tc+55°$ C. Tc is the crystallization temperature of the fluororesin-based polymer solution. The time for which the polymer solution is held under these pressure and temperature is preferably 10 seconds or more, more preferably 20 second or more.

Specifically, at any site of a solution feed line for delivering the polymer solution to the spinneret, a retention part for allowing the polymer solution to stay is provided, and a pressurizing unit for applying a pressure to the retained polymer solution and a temperature-adjusting unit for adjusting the temperature of the retained polymer solution (for example, a heating unit) are provided. The pressurizing unit is not particularly limited, but by disposing two or more pumps in the solution feed line, a pressure can be applied to any site therebetween. The pump includes a piston pump, a plunger pump, a diaphragm pump, a wing pump, a gear pump, a rotary pump, a screw pump, etc., and two or more kinds of pumps may be used.

Through this step, a pressure is applied under the conditions in which crystallization easily takes place, and therefore, it is presumed that crystal growth has anisotropy and in turn, not an isotropic spherical structure but a texture oriented in the longitudinal direction of the porous hollow fiber membrane is developed, as a result, a columnar structure is obtained.

Here, the crystallization temperature Tc of the fluororesin-based polymer solution is defined as follows. In an apparatus for differential scanning calorimetry (DSC measurement), a mixture having the same composition as the composition of the membrane-forming polymer solution containing a fluororesin-based polymer, a solvent, etc. is sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min is Tc.

The cooling bath for cooling the fluororesin-based polymer solution discharged from the spinneret is described below. In the cooling bath, a mixed liquid including a poor or good solvent in a concentration of 50 to 95 wt % and a nonsolvent in a concentration of 5 to 50 wt % is preferably used. As the poor solvent, use of the same poor solvent as that in the polymer solution is preferably employed. For the hollow part-forming liquid, as with the cooling bath, a mixed liquid including a poor or good solvent in a concentration of 50 to 95 wt % and a nonsolvent in a concentration of 5 to 50 wt % is preferably used. As the poor solvent, use of the same poor solvent as that in the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy and can energetically stabilize and therefore be caused to preferentially occur over the growth in portions other than the narrowed portion, and intensive studies have been made on the method for enhancing the thickness uniformity.

As a result, it has been found that as the method for promoting polymer uptake/growth into the narrowed portion, the thermally induced phase separation preferably includes at least one of the following cooling steps a) and b):

a) a step of soaking the membrane-forming solution in a cooling bath at a temperature Tb satisfying $Tc-30°$ C.$< Tb \leq Tc$: and b) a step of soaking the membrane-forming solution in a cooling bath at a temperature Tb1 satisfying $Tb1 \leq Tc-30°$ C., followed by soaking in a cooling bath at a temperature Tb2 satisfying $Tc-30°$ C.$< Tb2 \leq Tc$, (wherein Tc is the crystallization temperature of the membrane-forming solution containing a fluororesin-based polymer).

In the present invention, it has been found that as the method a), when cooling/solidification in a cooling bath is performed near the crystallization temperature of the polymer solution, the cooling/solidification slowly proceeds. In this case, denoting Tc as the crystallization temperature of the fluororesin-based polymer solution, the temperature Tb of the cooling bath is set to satisfy $Tc-30°$ C.$< Tb \leq Tc$, and $Tc-20°$ C.$< Tb \leq Tc$ is more preferred.

The passing time in the cooling bath (i.e., soaking time in the cooling bath) is not particularly limited as long as enough time to complete the thermally induced phase separation including polymer uptake/growth into the narrowed portion can be ensured, and the passing time may be experimentally determined by taking into account the number of hollow-fiber membranes, the spinning speed, the bath ratio, the cooling capacity, etc.

However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, as the method b), two or more stages of cooling may be performed. Specifically, the cooling step may include a step of cooling the solution by using a first cooling bath for promoting generation/growth of a crystal nucleus by increasing the supercooling degree, and a step of thereafter cooling the solution by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of the phase separation.

In this case, when the temperature Tb1 of the first cooling bath for cooling the fluororesin polymer solution discharged from the spinneret satisfies $Tb1 \leq Tc-30°$ C., the generation and growth of a crystal nucleus can be promoted by increasing the supercooling degree, and when the temperature Tb2 of the second cooling bath is set to a temperature near the crystallization temperature (specifically, set to satisfy Tc−30° C.<Tb2≤Tc, preferably Tc−20° C.<Tb2≤Tc), the polymer uptake/growth into the narrowed portion can be promoted. Tc is the crystallization temperature of the polymer solution.

The passing time in each cooling bath can be varied, but it is favorable to set, for example, the passing time in the first cooling bath to be from 1 to 20 seconds, preferably from 3 to 15 seconds, more preferably from 5 to 10 seconds, and set the passing time in the second cooling bath to be 10 seconds or more, preferably 20 seconds or more, more preferably 30 seconds or more.

When a texture having a thickness uniformity of less than 0.60 is referred to as "fibrous texture" so as to distinguish it from the columnar texture, the hollow-fiber membrane disclosed in JP-A-2006-297383 (Patent Document 5) is a hollow-fiber membrane having a fibrous texture. Such a porous hollow-fiber membrane having a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds starting from a void part at the time of stretching, the stretching itself is very difficult. This tendency is prominent in particular when the hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture described in Patent Document 5, it is considered that stress during stretching is dispersed by the fibrous texture oriented in the longitudinal direction and stretching can be performed even though the stretch ratio is as low as less than 2.0 times. However, it is still very difficult to uniformly conduct high-ratio stretching of 2.0 times of more, and intensive studies on the cause thereof have revealed that a fibrous texture has many narrowed portions and because stress is concentrated at the narrowed portion during stretching and the narrowed portion is therefore preferentially stretched, the entire fibrous texture cannot be uniformly stretched, making it impossible to increase the stretch ratio.

In contrast, the present inventors have found that it is not a fibrous texture having a large number of narrowed portions described in Patent Document 5, not a network structure described in Patent Document 3, and not a spherical structure described in Patent Document 4 but as long as it is a hollow fiber having a columnar texture with uniform thickness, the entire columnar texture can be uniformly stretched, and consequently, high-ratio stretching of 2.0 times or more is made possible. Such uniform and high-ratio stretching has yielded success in stretching and orienting the molecular chain of the fluororesin-based polymer in the longitudinal direction of the porous hollow-fiber membrane and success in increasing the strength while maintaining high pure-water permeation performance.

(c) Stretching

Finally, in the present invention, the porous hollow-fiber membrane including a fluororesin-based polymer and having a columnar texture, obtained by the method above, is stretched at a high ratio, and the molecular chain of the polymer is thereby oriented in the longitudinal direction of the hollow-fiber membrane.

The stretch ratio is from 2.0 to 5.0 times, preferably from 2.5 to 4.0 times, more preferably from 2.5 to 3.5 times. If the stretch ratio is less than 2.0 times, the molecular chain cannot be sufficiently oriented by stretching, and if the stretch ratio exceeds 5.0 times, reduction in the elongation increases.

The stretching temperature is preferably from 60 to 140° C., more preferably from 70 to 120° C., still more preferably from 80 to 100° C. If stretching is performed in a low temperature atmosphere of less than 60° C., it is difficult to stably and homogeneously stretch the hollow fiber. If the hollow fiber is stretched at a temperature exceeding 140° C., since the temperature is close to the melting point of the fluororesin-based polymer, the structure texture may be melted to reduce the pure-water permeation performance.

Stretching in a liquid is preferred because of ease of temperature control, but the stretching may also be performed in a gas such as steam. As the liquid, water is simple and preferred, but in the case of stretching the hollow fiber at about 90° C. or more, use of a low-molecular-weight polyethylene glycol, etc. may also be preferably employed.

<Cross-Flow Filtration Method, Transmembrane Pressure Difference>

In the cross-flow filtration, a raw liquid flows in through the raw liquid inflow port 8 of the hollow-fiber membrane module 100, and the raw liquid is discharged from the raw liquid outlet 10. In addition, the filtered liquid is delivered to the upper part of the hollow-fiber membrane module 100 through the hollow part of the hollow-fiber membrane and discharged from the filtered liquid outlet 9.

As described above, in the cross-flow filtration, the raw liquid flows in parallel to the membrane surface. At this time, the membrane surface linear velocity may be appropriately set in accordance with the property of the raw liquid but is preferably from 0.3 to 5 m/s.

The filtration flux at the time of cross-flow filtration may be appropriately set in accordance with the property of the raw liquid but is preferably from 0.1 to 5.0 m$^3$/m$^2$/d, more preferably from 0.3 to 3.0 m$^3$/m$^2$/d.

In the filtration by a separation membrane, the clogging state of the separation membrane can be determined from the transmembrane pressure difference obtained by subtracting the pressure on the filtered liquid side from the pressure on the raw liquid side of the separation membrane, and in the case of dead-end filtration, the transmembrane pressure difference can be calculated using a manometer on the upstream side of the raw liquid inflow port 8 of the hollow-fiber membrane module 100 and a pressure on the downstream side of the filtered liquid outlet 9. If the filtration flux is the same, when clogging of the separation membrane develops, the transmembrane pressure difference rises. However, in the case of cross-flow filtration, the pressure loss at the time of passing of raw liquid through the raw liquid-side passage of the hollow-fiber membrane module 100 is large, and the transmembrane pressure difference calculated by the above-described method also contains a pressure loss in the raw liquid-side passage and therefore, is difficult to appropriately calculate. Accordingly, denoting P1 as the filtered liquid-side pressure when filtration is stopped while feeding raw liquid to the raw liquid side of the hollow-fiber membrane module 100 and denoting P2 as the filtered liquid-side pressure when filtration is preformed while feeding raw liquid to the raw liquid side of the hollow-fiber membrane module 100, ΔP that is a value obtained by subtracting P2 from P1 may be used as the transmembrane pressure difference at the time of cross-flow filtration.

<Backwashing Method>

In the cross-flow filtration, backwashing can also be conducted by periodically stopping filtration. Backwashing is conducted to clean the membrane by feeding a backwashing solution from the filtered liquid outlet 9 of the hollow-fiber membrane module 100 and flowing the backwashing solution toward the outer side from the inner side of the hollow-fiber membrane. When the water permeability is recovered by backwashing, the filtration time can be extended, and the frequency of chemical cleaning decreases, so that the operation cost can be reduced. The backwashing can be conducted with the filtered liquid, or other liquid such as water may also be used.

The backwashing flux during backwashing may be appropriately set in accordance with the property of raw liquid or the clogging state of separation membrane but is preferably from 1.0 to 10.0 m$^3$/m$^2$/d, more preferably from 1.5 to 5.0 m$^3$/m$^2$/d. If the backwashing flux is less than 1.0 m$^3$/m$^2$/d, this is disadvantageous in that the cleaning effect is decreased. If the backwashing flux exceeds 10.0 m$^3$/m$^2$/d, this is disadvantageous in that the power cost increases and a large amount of solution needs to be used for backwashing.

EXAMPLES

The present invention is described below by referring to specific Examples, but the present invention is not limited by these Examples in any way. Incidentally, the physical property values related to the present invention can be measured by the following methods.

(i) Pure-Water Permeation Performance

A compact module including 4 porous hollow-fiber membranes and having an effective length of 200 mm was manufactured. Distilled water was delivered to the module over 1 hour under the conditions of a temperature of 25° C. and a filtration pressure difference of 16 kPa. and the amount (m$^3$) of the permeate obtained was measured, converted into a numerical value per unit time (h) and unit membrane area (m$^3$), further converted in terms of a pressure (50 kPa), and used as the pure-water permeation performance (m$^3$/m$^2$/h). The unit membrane area was calculated from the average outside diameter and the effective length of the hollow-fiber membrane.

(ii) Breaking Strength, Elongation at Break, Young's Modulus

Using a tensile tester (TENSILON (registered trademark)/RTM-100, manufactured by Toyo Baldwin Co., Ltd.), a sample having a measurement length of 50 mm was tested five or more times by changing the sample in an atmosphere of 25° C. at a tensile speed of 50 mm/min, and the breaking strength, elongation at break and Young's modulus were calculated by determining respective average values.

(iii) Raman Orientation Parameter v

The orientation parameter of the polyvinylidene fluoride homopolymer in the hollow-fiber membrane was determine by the following operation.

A cross-section in the longitudinal direction of the hollow-fiber membrane was sliced by cutting with a microtome, and 10 columnar textures were selected per one hollow-fiber membrane. For each columnar texture, the scattering intensity was measured by Raman spectroscopy at 1 μm intervals along the longitudinal direction of columnar texture while checking the columnar texture by an optical microscope.

The Raman orientation parameter of each texture was calculated according to formula (1), and an average value of respective Raman orientation parameters was defined as the Raman orientation parameter v. In addition, among 10 columnar textures different from each other, a largest Raman orientation parameter and a smallest Raman orientation parameter were selected, respective average values were determined and denoted as maximum Raman orientation parameter M and minimum Raman orientation parameter m, and M/m was calculated.

$$\text{Raman orientation parameter} = (I1270/I840)\text{parallel}/(I1270/I840)\text{perpendicular} \quad (1)$$

wherein:

parallel condition: the longitudinal direction of the hollow-fiber membrane is parallel to the polarization direction, perpendicular condition: the longitudinal direction of the hollow-fiber membrane is orthogonal to the polarization direction, I1270 parallel: the intensity of Raman band at 1,270 cm$^{-1}$ under parallel condition, I1270 perpendicular: the intensity of Raman band at 1,270 cm$^{-1}$ under perpendicular condition, I840 parallel: the intensity of Raman band at 840 cm$^{-1}$ under parallel condition, and I840 perpendicular: the intensity of Raman band at 840 cm$^{-1}$ under perpendicular condition.

The laser Raman spectrometer and measurement conditions are as follows.

Apparatus: Jobin Yvon/Atago Bussan, T-64000
Conditions:
Measurement mode: micro-Raman
Object lens: ×100
Beam diameter: 1 μm
Light source: Ar+laser/514.5 nm
Laser power: 100 mW
Diffraction grating: Single 600 gr/mm
Slit: 100 μm
Detector: CCD/Jobin Yvon 1024×256

(iv) Thickness Uniformity

First, the hollow-fiber membrane was resin-embedded in an epoxy resin and subjected to osmium staining treatment, and the void portion was thereby filled with the epoxy resin. Next, using a scanning electron microscope (SEM) equipped with a focused ion beam (FIB), a face parallel to the short-side direction of the hollow-fiber membrane was cut out using FIB, and FIB cutting and SEM observation were repeatedly conducted 200 times at 50 nm intervals toward the longitudinal direction of the hollow-fiber membrane to obtain information at a depth of 10 μm.

The thickness uniformity was determined by comparing a first cross-section and a second cross-section each running in parallel to the short-side direction of the hollow-fiber membrane, which were obtained in the above-described continuous cross-sectional observation using FIB. Here, 20 pairs of first cross-section and second cross-section were selected such that these cross-sections were faces parallel to each other and spaced 5 μm apart.

First, in each cross-section, a portion including resin and a void portion (epoxy portion) were distinguished, and the area of the resin portion and the area of the void portion were measured. Subsequently, the area of a portion where when the first cross-section is projected onto the second cross-section from a direction perpendicular to both cross-sections, the portion including resin in the first cross-section and the portion including resin in the second cross-section are overlapped (overlap area), was determined.

The thickness uniformities in each pair were calculated as values obtained by averaging thickness uniformities A and B determined according to the following formulae (6) and (7). Since 20 average values of A and B are obtained, an average value obtained from these 20 values was defined as the thickness uniformity of the membrane.

In addition, the membrane was determined to have a columnar texture when 16 pairs or more have a thickness uniformity of 0.50 or more, and determined to have a fibrous texture when 15 pairs or less have the thickness uniformity above.

Thickness uniformity $A$=(overlap area)/(area of resin portion of second cross-section)  (6)

Thickness uniformity $B$=(overlap area)/(area of resin portion of first cross-section)  (7)

(v) Orientation Degree π of Molecular Chain in Longitudinal Direction of Hollow-Fiber Membrane A hollow-fiber membrane was fixed to a fiber sample stage by arranging its longitudinal direction to run vertically and subjected to X-ray diffraction measurement (2θ/θ scanning, β scanning) by using an X-ray diffractometer (Smart-Lab for polymer, CuKα ray, manufactured by Rigaku Corporation). First, it was confirmed by 2θ/θ scanning that a peak top is present at 2θ=20.4°. Next, the intensity in the range from 0° up to 360° in the azimuth angle direction, relative to the diffraction peak at 2θ=20.4°, was measured by 0 scanning to obtain an intensity distribution in the azimuth angle direction. Here, when the ratio between the intensity at an azimuth angle of 180° and the intensity at an azimuth angle of 90° was 0.80 or less or was 1.25 or more, it is regarded that a peak is present and by determining the width at a position of half the peak height (half-width H) from the intensity distribution in the azimuth angle direction, the orientation degree π was calculated according to the following formula (2). Since a minimum value of the intensity in β scanning was observed at 0° and around 180°, a straight line passing these points was used as a baseline.

Orientation degree $\pi$=(180°−$H$)/1800  (2)

(vi) Longitudinal Length and Short-Side Length of Columnar Texture

With respect to the hollow-fiber membrane manufactured in each working example, a cross-section along its longitudinal direction was photographed at a magnification of 3,000 times by means of a scanning electron microscope. On the image photographed, 10 columnar textures were randomly selected, and the longitudinal length and short-side length of each texture were measured. Here, as the longitudinal length of each columnar texture, the maximum length in the longitudinal direction was measured. Furthermore, as described above, a value obtained by dividing the longitudinal length of each columnar texture by 1 μm and rounding the quotient down to the nearest integer is used as the number of measurement points, and the short-side length of each columnar texture was determined by measuring the length in the short-side direction and calculating an average value thereof.

The photographing above was performed at 5 sites and by determining the longitudinal length and short-side length for arbitrary 10 columnar textures at each site, a total of 50 longitudinal lengths and a total of 50 short-side lengths were obtained. Subsequently, an average value of a total of 50 longitudinal lengths was calculated and used as a representative value of the longitudinal length, and an average value of a total of 50 short-side lengths was calculated and used as a representative value of the short-side length.

(vii) Porosity

With respect to arbitrary 20 cross-sections selected from 20 pairs of first cross-section and second cross-section obtained in "(vi) Thickness Uniformity", i.e., a total of 40 cross-sections, the porosity was determined according to the following formula (8) by using the area of the resin portion and the area of the void portion, and an average value thereof was used.

Porosity (%)={100×(area of void portion)}/{(area of resin portion)+(area of void portion)}  (8)

(viii) Occupancy of Texture

The occupancy of the texture was determined according to the following formula (9) after taking a photograph of a cross-section in the longitudinal direction of the hollow-fiber membrane by means of a scanning electron microscope at a magnification of 3,000 times in arbitrary 20 places, and an average value thereof was employed. Here, the area of the entire photograph and the area occupied by a texture were determined by printing the taken photograph on paper and converting respective areas into the weight of paper corresponding to the entire photograph and the weight of paper corresponding to a texture portion cut out therefrom.

Occupancy (%)=((area occupied by each texture)/(area of entire photograph))×100  (9)

(ix) Crystallization Temperature Tc of Fluororesin-Based Polymer Solution

Using DSC-6200 manufactured by Seiko Instruments & Electronics Ltd., a mixture having the same composition as the composition of the membrane-forming polymer solution containing a fluororesin-based polymer, a solvent, etc. was sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min was used as the crystallization temperature Tc.

Reference Example 1

35 wt % of a vinylidene fluoride homopolymer (KF1300, produced by Kureha Corporation, weight average molecular weight: 417,000, number average molecular weight: 221,000) having a weight average molecular weight of 417,000 and 65 wt % of γ-butyrolactone were dissolved at 150° C. Tc of the thus-obtained vinylidene fluoride homopolymer solution (i.e., raw material solution) was 46° C.

For the pressurization and discharge of the raw material solution, an apparatus having a double tube-type spinneret, a piping connected to the spinneret, and two gear pumps disposed on the piping was used. Within the piping between gear pumps, the raw material solution was retained at 99 to 101° C. for 15 seconds under a pressure of 2.5 MPa. Thereafter, while discharging an aqueous 85 wt % γ-butyrolactone solution through the inner tube of the double tube-type spinneret, the raw material solution was discharged through the outer tube. The raw material solution was allowed to stay in a cooling bath at a temperature of 20° C. containing an aqueous 85 wt % γ-butyrolactone solution for 20 seconds and thereby solidified.

The obtained hollow-fiber had a columnar texture with a thickness uniformity of 0.55, where the occupancy of columnar texture was 85% and the occupancy of spherical texture was 15%.

The hollow-fiber obtained above was then stretched to 2.0 times at a stretching speed of 9%/sec in water at 95° C.

The hollow-fiber membrane after stretching was observed, as a result, a columnar texture was recognized. Furthermore, the hollow-fiber membrane had a columnar texture with a representative value of longitudinal length of 16 μm, a representative value of short-side length of 2.1 μm, and a thickness uniformity of 0.51, where the porosity was 56%, the orientation degree π of the molecular chain of vinylidene fluoride homopolymer in the longitudinal direction of the hollow-fiber membrane could not be calculated, that is, the molecular chain was non-oriented, the Raman orientation parameter ν was 1.82, the maximum Raman orientation parameter M was 2.31, the minimum Raman orientation parameter m was 1.32, and M/m was 1.8. Here, the outside diameter of the hollow-fiber membrane obtained was 850 μm, and the inside diameter was 550 μm. Furthermore, the breaking strength of the hollow-fiber membrane was 26 MPa, and the pure-water permeation performance was 1.0 m$^3$/m$^2$/hr.

Reference Example 2

A raw material solution was prepared in the same manner as in Reference Example 1 except that the concentration of the vinylidene fluoride homopolymer was changed to 39 wt %. Tc of the raw material solution was 49° C.

The raw material solution was retained at 99 to 101° C. for 20 seconds under a pressure of 2.5 MPa applied by means of the same apparatus as in Reference Example 1 and then discharged from the same double tube-type spinneret as in Reference Example 1. The raw material solution discharged was allowed to stay in a first cooling bath at a temperature of 5° C. containing an aqueous 85 wt % γ-butyrolactone solution for 10 seconds, further allowed to stay in a second cooling bath at a temperature of 30° C. containing an aqueous 85 wt % γ-butyrolactone solution for 40 seconds, and thereby solidified.

The obtained hollow-fiber had a columnar texture with a thickness uniformity of 0.69, where the occupancy of columnar texture was 91% and the occupancy of spherical texture was 9%.

The hollow-fiber obtained above was then stretched to 2.4 times at a stretching speed of 142%/sec in water at 95° C.

The hollow-fiber membrane after stretching had a columnar texture with a representative value of longitudinal length of 22 μm, a representative value of short-side length of 1.8 μm, and a thickness uniformity of 0.62, where the porosity was 54%, the orientation degree π of the molecular chain of vinylidene fluoride homopolymer in the longitudinal direction of the hollow-fiber membrane was 0.31, the Raman orientation parameter ν was 2.53, the maximum Raman orientation parameter M was 3.08, the minimum Raman orientation parameter m was 1.14, and M/m was 2.7. Here, the outside diameter of the hollow-fiber membrane obtained was 850 μm, and the inside diameter was 550 μm. Furthermore, the breaking strength of the hollow-fiber membrane was 35 MPa, and the pure-water permeation performance was 1.6 m$^3$/m$^2$/hr.

Reference Example 3

42 wt % of a vinylidene fluoride homopolymer (KF1300, produced by Kureha Corporation, weight average molecular weight: 417,000, number average molecular weight: 221,000) having a weight average molecular weight of 417,000 and 58 wt % of dimethylsulfoxide were dissolved at 130° C. Tc of the thus-obtained vinylidene fluoride homopolymer solution (i.e., raw material solution) was 35° C.

The raw material solution was retained at 78 to 80° C. for 20 seconds under a pressure of 2.5 MPa applied by means of the same apparatus with gear pumps as in Reference Example 1. Thereafter, while discharging an aqueous 90 wt % dimethylsulfoxide solution through the inner tube of the double tube-type spinneret, the raw material solution was discharged through the outer tube. The raw material solution discharged was allowed to stay in a first cooling bath at a temperature of −3° C. containing an aqueous 85 wt % dimethylsulfoxide solution for 10 seconds, further allowed to stay in a second cooling bath at a temperature of 20° C. containing an aqueous 85 wt % dimethylsulfoxide solution for 50 seconds, and thereby solidified. The obtained hollow-fiber had a columnar texture with a thickness uniformity of 0.72, where the occupancy of columnar texture was 95% and the occupancy of spherical texture was 5%.

The hollow-fiber obtained above was then stretched to 2.4 times at a stretching speed of 125%/sec in water at 95° C. The hollow-fiber membrane after stretching had a columnar texture with a representative value of longitudinal length of 22 μm, a representative value of short-side length of 1.8 μm, and a thickness uniformity of 0.70, where the porosity was 56%, the orientation degree π of the molecular chain of vinylidene fluoride homopolymer in the longitudinal direction of the hollow-fiber membrane was 0.34, the Raman orientation parameter ν was 2.96, the maximum Raman orientation parameter M was 3.31, the minimum Raman orientation parameter m was 1.42, and M/m was 2.3. Here, the outside diameter of the hollow-fiber membrane obtained was 850 μm, and the inside diameter was 550 μm. Furthermore, the breaking strength of the hollow-fiber membrane was 29 MPa, and the pure-water permeation performance was 2.2 m$^3$/m$^2$/hr.

Reference Example 4

A raw material solution was prepared in the same manner as in Reference Example 1 except that the concentration of the vinylidene fluoride homopolymer was changed to 39 wt %. Tc of the raw material solution was 49° C.

The raw material solution was retained at 99 to 101° C. for 20 seconds under a pressure of 2.5 MPa applied by means of the same apparatus as in Reference Example 1. Thereafter, the raw material solution was discharged from the double tube-type spinneret in the same manner as in Reference Example 1. The raw material solution discharged was allowed to stay in a first cooling bath at a temperature of 5° C. containing an aqueous 85 wt % γ-butyrolactone solution for 10 seconds, further allowed to stay in a second cooling bath at a temperature of 35° C. containing an aqueous 85 wt % γ-butyrolactone solution for 50 seconds, and thereby solidified.

The obtained hollow-fiber had a columnar texture with a thickness uniformity of 0.68, where the occupancy of columnar texture was 92% and the occupancy of spherical texture was 8%.

The hollow-fiber obtained above was then stretched to 1.8 times at a stretching speed of 2%/sec in water at 95° C.

The hollow-fiber membrane after stretching had a columnar texture with a representative value of longitudinal length of 13 μm, a representative value of short-side length of 1.9 μm, and a thickness uniformity of 0.66, where the porosity was 53%, the orientation degree π of the molecular chain of vinylidene fluoride homopolymer in the longitudinal direction of the hollow-fiber membrane could not be calculated, that is, the molecular chain was non-oriented, the Raman orientation parameter ν was 2.13, the maximum Raman orientation parameter M was 2.69, the minimum Raman orientation parameter m was 1.65, and M/m was 1.6. Here, the outside diameter of the hollow-fiber membrane obtained was 850 μm, and the inside diameter was 550 μm. Furthermore, the breaking strength of the hollow-fiber membrane was 27 MPa, and the pure-water permeation performance was 0.7 m³/m²/hr.

Reference Example 5

A raw material solution was prepared in the same manner as in Reference Example 1 except that the concentration of the vinylidene fluoride homopolymer was changed to 36 wt %. Tc of the raw material solution was 48° C.

The raw material solution was pressurized in the same manner as in Reference Example 1 and then discharged from the double tube-type spinneret. The raw material solution discharged was allowed to stay in a first cooling bath at a temperature of 10° C. containing an aqueous 85 wt % γ-butyrolactone solution for 10 seconds, further allowed to stay in a second cooling bath at a temperature of 20° C. containing an aqueous 85 wt % γ-butyrolactone solution for 20 seconds, and thereby solidified.

The obtained hollow-fiber had a columnar texture with a thickness uniformity of 0.64, where the occupancy of columnar texture was 87% and the occupancy of spherical texture was 13%.

The hollow-fiber obtained above was then stretched to 2.4 times at a stretching speed of 44%/sec in water at 95° C. The hollow-fiber membrane after stretching had a columnar texture with a representative value of longitudinal length of 18 μm, a representative value of short-side length of 1.9 μm, and a thickness uniformity of 0.60, where the porosity was 55%, the orientation degree π of the molecular chain of vinylidene fluoride homopolymer in the longitudinal direction of the hollow-fiber membrane was 0.25, the Raman orientation parameter ν was 2.35, the maximum Raman orientation parameter M was 2.84, the minimum Raman orientation parameter m was 1.21, and M/m was 2.4. Here, the outside diameter of the hollow-fiber membrane obtained was 850 μm, and the inside diameter was 550 μm. Furthermore, the breaking strength of the hollow-fiber membrane was 26 MPa, and the pure-water permeation performance was 2.0 m³/m²/hr.

Reference Example 6

A raw material solution was prepared in the same manner as in Reference Example 1. The raw material solution was retained at 99 to 101° C. for 20 seconds under a pressure of 2.5 MPa applied by means of the same apparatus as in Reference Example 1. Thereafter, the raw material solution was discharged from the spinneret in the same manner as in Reference Example 1. The raw material solution discharged was allowed to stay in a cooling bath at a temperature of 5° C. containing an aqueous 85 wt % γ-butyrolactone solution for 20 seconds and thereby solidified.

The obtained hollow-fiber had a columnar texture with a thickness uniformity of 0.42, where the occupancy of columnar texture was 90% and the occupancy of spherical texture was 10%.

The hollow-fiber obtained above was then stretched to 1.5 times at a stretching speed of 44%/sec in water at 95° C.

The hollow-fiber membrane after stretching had a columnar texture with a representative value of longitudinal length of 12 μm, a representative value of short-side length of 2.2 μm, and a thickness uniformity of 0.39, where the porosity was 56%, the orientation degree π of the molecular chain of vinylidene fluoride homopolymer in the longitudinal direction of the hollow-fiber membrane could not be calculated, that is, the molecular chain was non-oriented, the Raman orientation parameter ν was 1.01, the maximum Raman orientation parameter M was 1.03, the minimum Raman orientation parameter m was 1.00, and M/m was 1.0. Here, the outside diameter of the hollow-fiber membrane obtained was 850 μm, and the inside diameter was 550 μm. Furthermore, the breaking strength of the hollow-fiber membrane was 11 MPa, and the pure-water permeation performance was 1.0 m³/m²/hr.

Reference Example 7

36 wt % of a vinylidene fluoride homopolymer (KF1300, produced by Kureha Corporation, weight average molecular weight: 417,000, number average molecular weight: 221, 000) and 64 wt % of γ-butyrolactone were dissolved at 150° C. Tc of the vinylidene fluoride homopolymer solution was 48° C. By disposing two gear pumps, the solution was retained at 99 to 101° C. for 20 seconds on a line therebetween under a pressure of 2.0 MPa. Thereafter, the solution was discharged through the outer tube of a double tube-type spinneret while discharging an aqueous 85 wt % γ-butyrolactone solution through the inner tube of the double tube-type spinneret, then allowed to stay in a cooling bath at a temperature of 25° C. containing an aqueous 85 wt % γ-butyrolactone solution for 20 seconds, and thereby solidified. The obtained hollow-fiber had a columnar texture with a thickness uniformity of 0.62, where the occupancy of columnar texture was 86% and the occupancy of spherical texture was 14%.

The hollow-fiber obtained above was then stretched to 2.5 times in water at 95° C. The hollow-fiber membrane after stretching was observed, as a result, a columnar texture was recognized. Furthermore, the hollow-fiber membrane had a columnar texture with a representative value of longitudinal length of 16 μm, a representative value of short-side length of 2.2 μm, and a thickness uniformity of 0.61, where the porosity was 55%, the orientation degree π of the molecular chain of vinylidene fluoride homopolymer in the longitudinal direction of the hollow-fiber membrane was 0.61, the Raman orientation parameter ν was 3.12, and M/m was 3.1. In addition, the breaking strength of the hollow-fiber membrane was 27 MPa, and the pure-water permeation performance was 2.1 m³/m²/hr.

Reference Example 8

38 wt % of a vinylidene fluoride homopolymer (KF1300, produced by Kureha Corporation, weight average molecular weight: 417,000, number average molecular weight: 221, 000) and 62 wt % of γ-butyrolactone were dissolved at 150° C. Tc of the vinylidene fluoride homopolymer solution was 51° C. By disposing two gear pumps, the solution was retained at 99 to 101° C. for 20 seconds on a line therebetween under a pressure of 2.0 MPa. Thereafter, the solution was discharged through the outer tube of a double tube-type spinneret while discharging an aqueous 85 wt % γ-butyrolactone solution through the inner tube of the double tube-type spinneret, then allowed to stay in a first cooling bath at a temperature of 5° C. containing an aqueous 85 wt % γ-butyrolactone solution for 10 seconds, further allowed to stay in a second cooling bath at a temperature of 35° C. containing an aqueous 85 wt % γ-butyrolactone solution for 50 seconds, and thereby solidified. The obtained hollow-fiber had a columnar texture with a thickness uniformity of 0.66, where the occupancy of columnar texture was 91% and the occupancy of spherical texture was 9%.

Figure 5:
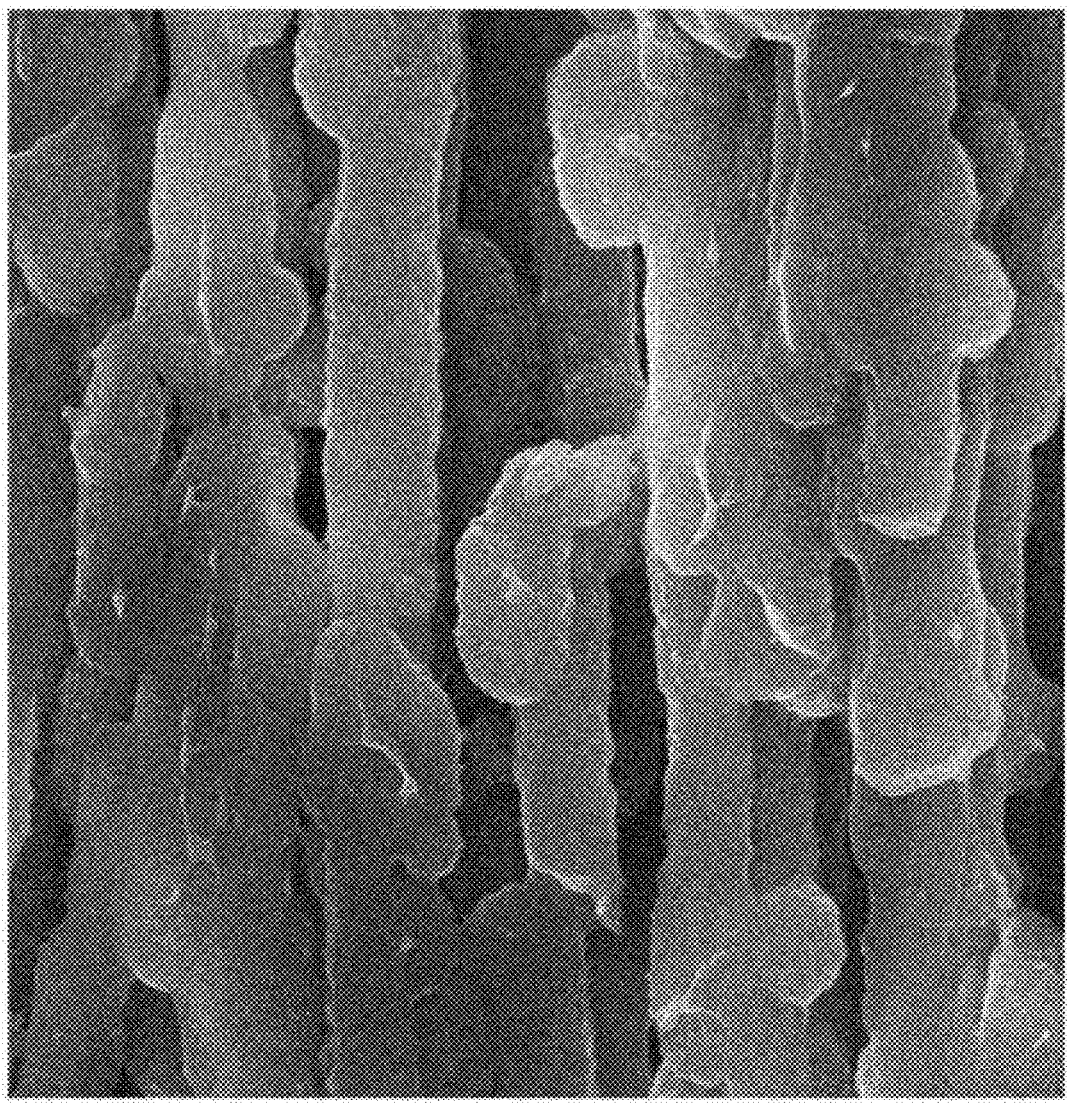
FIG. 5 is a diagram illustrating a photograph of a cross-section in the longitudinal direction of the hollow-fiber membrane of Reference Example 8.
Figure 8:
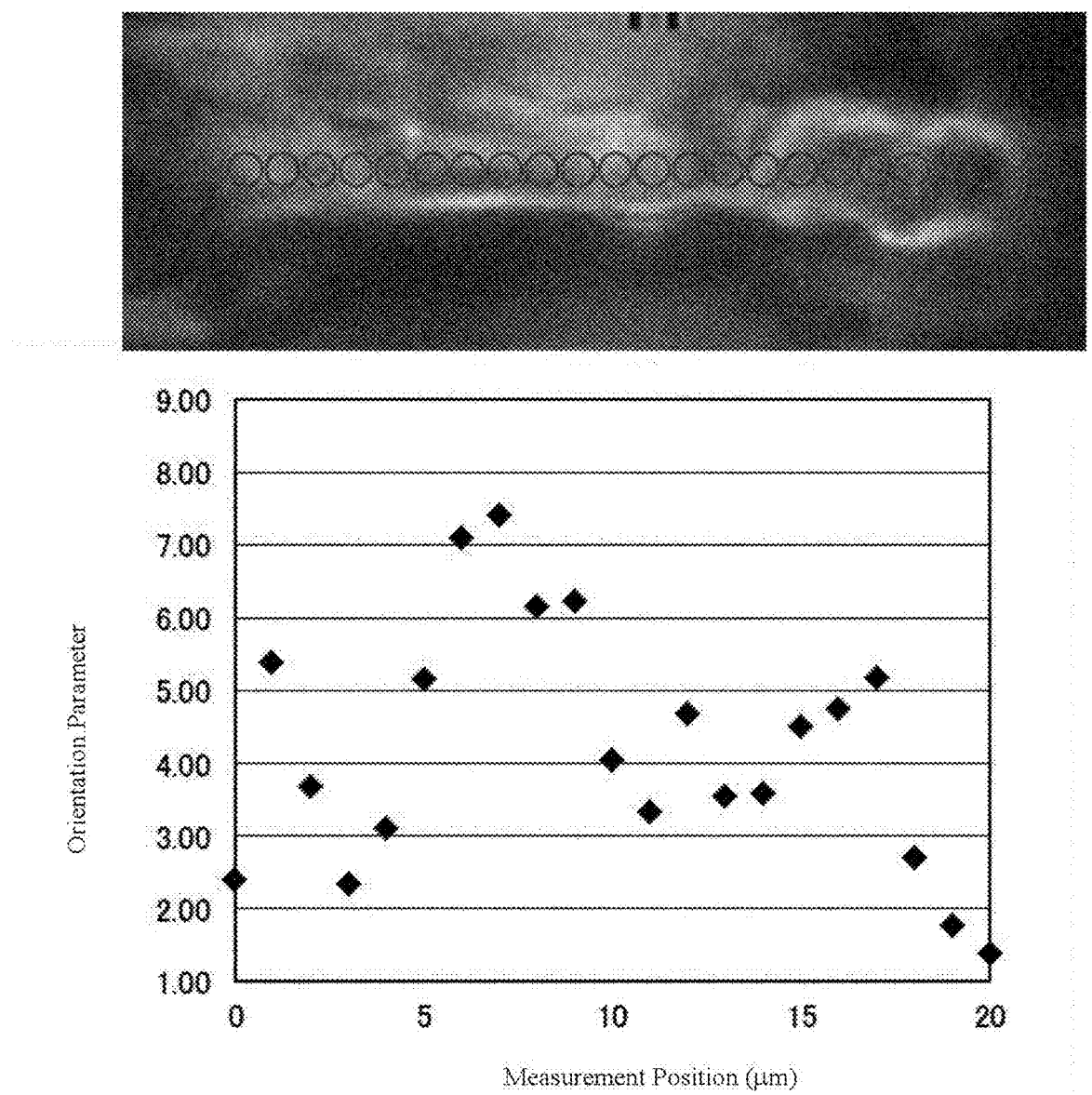
FIG. 8 is a diagram illustrating the Raman orientation parameter at each measurement site of the hollow-fiber membrane of Reference Example 8.

The hollow-fiber obtained above was then stretched to 3.5 times in water at 95° C. The hollow-fiber membrane after stretching had a columnar texture with a longitudinal length of 28 µm, a short-side length of 1.3 µm, and a thickness uniformity of 0.62, where the porosity was 61%, the orientation degree π of the molecular chain of vinylidene fluoride homopolymer in the longitudinal direction of the hollow-fiber membrane was 0.89, the Raman orientation parameter ν was 4.42, and M/m was 5.1. In addition, the breaking strength of the hollow-fiber membrane was 62 MPa, and the pure-water permeation performance was 2.6 m$^3$/m$^2$/hr. FIG. 5 illustrates a photograph of a cross-section in the longitudinal direction of the hollow-fiber membrane, FIG. 7 illustrates the intensity distribution in the azimuth angle direction at 2θ=20.4° of the hollow-fiber membrane, and FIG. 8 illustrates the Raman orientation parameter at each measurement site of the hollow-fiber membrane.

Reference Example 9

40 wt % of a vinylidene fluoride homopolymer (KF1300, produced by Kureha Corporation, weight average molecular weight: 417,000, number average molecular weight: 221,000) and 60 wt % of dimethylsulfoxide were dissolved at 130° C. Tc of the vinylidene fluoride homopolymer solution was 30° C. By disposing two gear pumps, the solution was retained at 78 to 80° C. for 20 seconds on a line therebetween under a pressure of 2.0 MPa. Thereafter, the solution was discharged through the outer tube of a double tube-type spinneret while discharging an aqueous 90 wt % dimethylsulfoxide solution through the inner tube of the double tube-type spinneret, then allowed to stay in a first cooling bath at a temperature of −5° C. containing an aqueous 85 wt % dimethylsulfoxide solution for 10 seconds, further allowed to stay in a first cooling bath at a temperature of 15° C. containing an aqueous 85 wt % dimethylsulfoxide solution for 30 seconds, and thereby solidified. The obtained hollow-fiber had a columnar texture with a thickness uniformity of 0.72, where the occupancy of columnar texture was 92% and the occupancy of spherical texture was 8%.

The hollow-fiber obtained above was then stretched to 3 times in water at 95° C. The hollow-fiber membrane after stretching had a columnar texture with a longitudinal length of 27 µm, a short-side length of 1.7 µm, and a thickness uniformity of 0.69, where the porosity was 64%, the orientation degree π of the molecular chain of vinylidene fluoride homopolymer in the longitudinal direction of the hollow-fiber membrane was 0.86, the Raman orientation parameter ν was 4.38, and M/m was 5.1. In addition, the breaking strength of the hollow-fiber membrane was 52 MPa, and the pure-water permeation performance was 2.3 m$^3$/m$^2$/hr.

Reference Example 10

40 wt % of a vinylidene fluoride homopolymer (KF1300, produced by Kureha Corporation, weight average molecular weight: 417,000, number average molecular weight: 221,000) and 60 wt % of dimethylsulfoxide were dissolved at 130° C. Tc of the vinylidene fluoride homopolymer solution was 30° C. By disposing two gear pumps, the solution was retained at 78 to 80° C. for 20 seconds on a line therebetween under a pressure of 2.0 MPa. Thereafter, the solution was discharged through the outer tube of a double tube-type spinneret while discharging an aqueous 90 wt % dimethylsulfoxide solution through the inner tube of the double tube-type spinneret, then allowed to stay in a first cooling bath at a temperature of −5° C. containing an aqueous 85 wt % dimethylsulfoxide solution for 10 seconds, further allowed to stay in a first cooling bath at a temperature of 20° C. containing an aqueous 85 wt % dimethylsulfoxide solution for 50 seconds, and thereby solidified. The obtained hollow-fiber had a columnar texture with a thickness uniformity of 0.72, where the occupancy of columnar texture was 95% and the occupancy of spherical texture was 5%.

The hollow-fiber obtained above was then stretched to 4 times in water at 95° C. The hollow-fiber membrane after stretching had a columnar texture with a longitudinal length of 40 µm, a short-side length of 1.1 µm, and a thickness uniformity of 0.63, where the porosity was 66%, the orientation degree π of the molecular chain of vinylidene fluoride homopolymer in the longitudinal direction of the hollow-fiber membrane was 0.92, the Raman orientation parameter ν was 4.76, and M/m was 6.2. In addition, the breaking strength of the hollow-fiber membrane was 68 MPa, and the pure-water permeation performance was 2.8 m$^3$/m$^2$/hr.

Reference Example 11

38 wt % of a vinylidene fluoride homopolymer (KF1300, produced by Kureha Corporation, weight average molecular weight: 417,000, number average molecular weight: 221,000) and 62 wt % of γ-butyrolactone were dissolved at 150° C. Tc of the vinylidene fluoride homopolymer solution was 51° C. By disposing two gear pumps, the solution was retained at 99 to 101° C. for 20 seconds on a line therebetween under a pressure of 2.0 MPa. Thereafter, the solution was discharged through the outer tube of a double tube-type spinneret while discharging an aqueous 85 wt % γ-butyrolactone solution through the inner tube of the double tube-type spinneret, then allowed to stay in a cooling bath at a temperature of 5° C. containing an aqueous 85 wt % γ-butyrolactone solution for 20 seconds, and thereby solidified. The obtained hollow-fiber had a fibrous texture with a thickness uniformity of 0.47, where the occupancy of fibrous texture was 91% and the occupancy of spherical texture was 9%.

Figure 6:
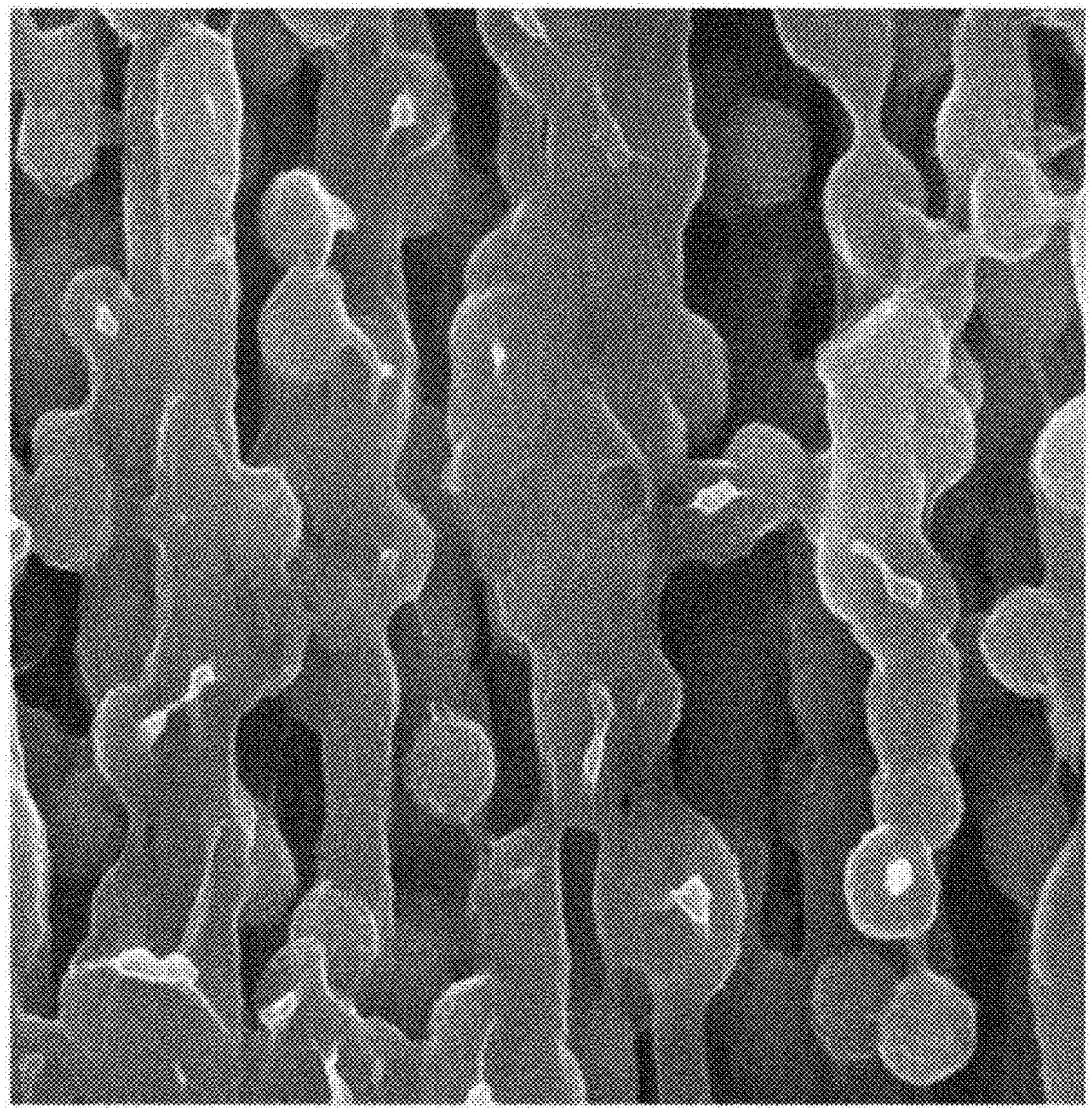
FIG. 6 is a diagram illustrating a photograph of a cross-section in the longitudinal direction of the hollow-fiber membrane of Reference Example 11.

The hollow-fiber obtained above was then stretched to 1.5 times in water at 95° C. The hollow-fiber membrane after stretching had a fibrous texture with a longitudinal length of 15 µm, a short-side length of 2.2 µm, and a thickness uniformity of 0.45, where the porosity was 63%, the molecular chain of vinylidene fluoride homopolymer was non-oriented, the Raman orientation parameter ν was 1.01, and M/m was 1.0. In addition, the breaking strength of the hollow-fiber membrane was 14 MPa, and the pure-water permeation performance was 2.3 m$^3$/m$^2$/hr. FIG. 6 illustrates a photograph of a cross-section in the longitudinal direction of the hollow-fiber membrane, and FIG. 7 illustrates the intensity distribution in the azimuth angle direction at 2θ=20.4° of the hollow-fiber membrane.

Example 1

(Manufacture of Module)

The hollow fiber membrane of Reference Example 1 was immersed in an aqueous 30 mass % glycerin solution for 1 hour and then air-dried. A bundle of the hollow fiber membranes was sealed with a silicone adhesive (produced by Dow Corning Toray Co., Ltd., SH850A/B, a mixture of two components mixed to afford a mass ratio of 50:50) at one end.

Figure 3:
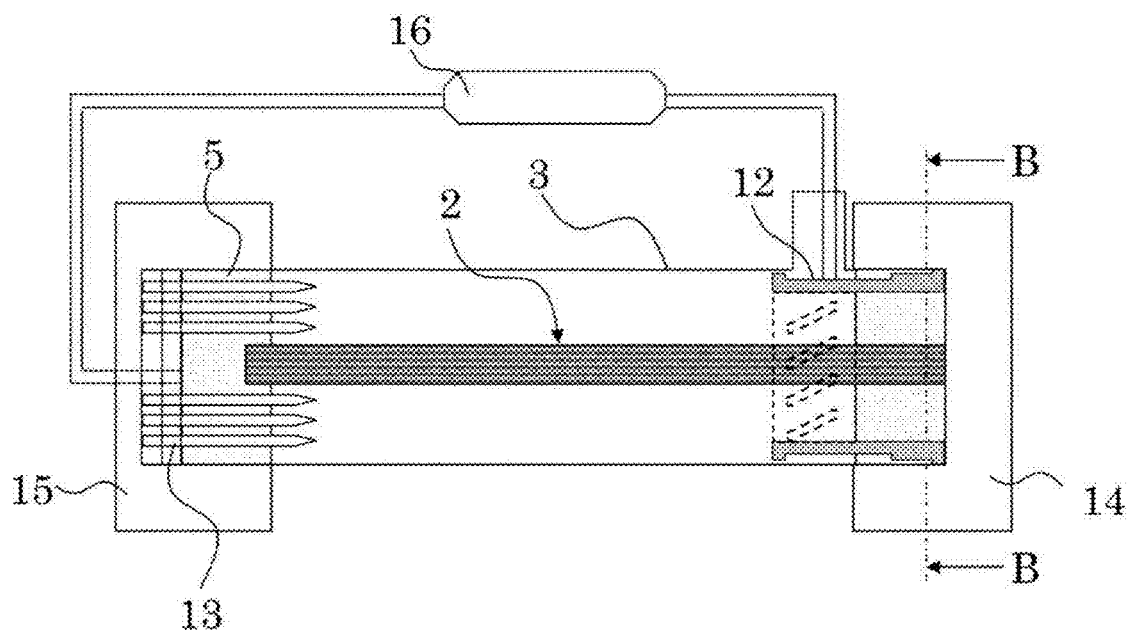
FIG. 3 is a schematic diagram illustrating the production method of the hollow-fiber membrane module of FIG. 1.

On the surfaces of a polysulfone-made cylindrical case 3 (inside diameter: 50 mm, length: 500 mm) and a flow regulating cylinder 12, the region to which a potting agent is bonded was preliminarily filed with sandpaper (#80) and degreased with ethanol. Thereafter, as illustrated in FIG. 3, the hollow-fiber membrane bundle was packed inside of the cylindrical case 3 and the flow regulating cylinder 12. At this time, the filling ratio of the hollow-fiber membrane was set to be 40%, the hollow-fiber membrane bundle was disposed such that the end part on the sealed side faces a first end part (right-side end part of FIG. 3) of the cylindrical case 3, which is defining the module upper-part side, and a potting cap 14 was further attached. A potting cap 15 having 36 holes in the bottom thereof was attached to a second end part (left-side end part of FIG. 3) defining the module lower-part side. Then, 36 pins 13 were inserted into the holes in the bottom of the potting cap 15 and secured. The positions of the pins 13 were arranged in the same fashion as the through holes of FIG. 2, and a module having potting caps attached to both ends in this way was installed in a centrifugal molding machine.

A polymeric MDI (produced by Huntsman Japan Co., Ltd., Suprasec 5025), a polybutadiene-based polyol (produced by Cray Valley. Krasol LBH 3000), and 2-ethyl-1,3-hexanediol were mixed to afford a mass ratio of 57:100:26. The obtained mixture (i.e., polyurethane resin solution) was put in a potting agent charger 16.

Subsequently, the centrifugal molding machine was rotated, and each of the potting caps at both ends was filled with the potting agent to form a first potting part 4 and a second potting part 5. The potting agent charger 16 is split in two directions, and the polyurethane resin solution was charged into the module upper-part side (first end part) and the module lower-part side (second end part) due to centrifugal force. The temperature in the centrifugal molding machine was set to be 35° C., and the centrifugation time was set to be 4 hours.

After the centrifugation, the potting caps and pins were removed, and the potting agent was cured at room temperature for 24 hours. Thereafter, the potting agent portion (B-B plane depicted in FIG. 3) on the outer side of the module upper-part side (first end part side) of the polysulfone-made cylindrical case 3 was cut with a chip saw-type rotary blade to open the end face of the hollow-fiber membrane. An upper cap 6 and a lower cap 7 were then fixed to both ends of the polysulfone-made cylindrical case to obtain a hollow-fiber membrane module 100.

After that, ethanol was delivered to the hollow-fiber membrane module 100 and filtered to fill the pores of the hollow-fiber membrane with ethanol. Subsequently. RO water was delivered and filtered to replace ethanol with RO water.

(Filtration Test)

A budding yeast (*Saccharomyces cerevisiae* strain CM3260) was cultured at 30° C. for 24 hours in a liquid culture medium containing 20 g/L of glucose, 5 g/L of ammonium sulfate, 0.59 g/L of potassium chloride, 0.1 g/L of sodium chloride, 0.1 g/L of calcium chloride, 0.5 g/L of magnesium sulfate heptahydrate, 0.02 g/L of uracil, 0.06 g/L of leucine, 0.02 g/L of histidine, and 0.04 g/L of tryptophane.

The resulting yeast culture fluid was subjected to cross-flow filtration by the hollow-fiber membrane module 100. In the cross-flow filtration, the membrane surface linear velocity was set to be 2.0 m's, and the filtration flux was set to be 1 m$^3$/m$^2$/d. Subsequently, backwashing with the filtered liquid was performed. The backwashing flux was set to be 2 m$^3$/m$^2$/d. After that, air scrubbing was performed by feeding a compressed air at 6 L/min through the module lower part. The filtration time, backwashing time, and air scrubbing time per cycle were set to be 28 minutes, 1 minute, and 1 minute, respectively, and with a cycle consisting of cross-flow filtration, backwashing and air scrubbing, 10 cycles were repeated. Denoting ΔP1 as the transmembrane pressure difference 1 minute after starting cross-flow filtration of the first cycle and ΔP2 as the transmembrane pressure difference 27 minutes after starting cross-flow filtration of the tenth cycle, the rising degree ΔP2/ΔP1 of transmembrane pressure difference was 2.5.

Example 2

A hollow-fiber membrane module 100 was manufactured by the same method as in Example 1 except that the filling ratio of the hollow-fiber membrane was changed to 60%, and cross-flow filtration of the yeast culture fluid was performed, as a result, the rising degree ΔP2/ΔP1 of transmembrane pressure difference was 2.2.

Example 3

A hollow-fiber membrane module 100 was manufactured by the same method as in Example 1 except that the filling ratio of the hollow-fiber membrane was changed to 75%, and cross-flow filtration of the yeast culture fluid was performed, as a result, the rising degree ΔP2/ΔP1 of transmembrane pressure difference was 2.0.

Example 4

A hollow-fiber membrane module 100 was manufactured by the same method as in Example 2 except that the hollow-fiber membrane of Reference Example 2 was used, and cross-flow filtration of the yeast culture fluid was performed, as a result, the rising degree ΔP2/ΔP1 of transmembrane pressure difference was 2.2.

Example 5

A hollow-fiber membrane module 100 was manufactured by the same method as in Example 2 except that the hollow-fiber membrane of Reference Example 3 was used, and cross-flow filtration of the yeast culture fluid was performed, as a result, the rising degree ΔP2/ΔP1 of transmembrane pressure difference was 2.1.

Example 6

A hollow-fiber membrane module 100 was manufactured by the same method as in Example 2 except that the hollow-fiber membrane of Reference Example 4 was used, and cross-flow filtration of the yeast culture fluid was performed, as a result, the rising degree ΔP2/ΔP1 of transmembrane pressure difference was 2.2.

Example 7

A hollow-fiber membrane module 100 was manufactured by the same method as in Example 2 except that the hollow-fiber membrane of Reference Example 5 was used, and cross-flow filtration of the yeast culture fluid was performed, as a result, the rising degree ΔP2/ΔP1 of transmembrane pressure difference was 2.1.

Comparative Example 1

A hollow-fiber membrane module 100 was manufactured by the same method as in Example 1 except that the filling ratio of the hollow-fiber membrane was changed to 25%, and cross-flow filtration of the yeast culture fluid was performed, as a result, the rising degree ΔP2/ΔP1 of transmembrane pressure difference was 3.4, revealing early clogging of the hollow-fiber membrane.

Comparative Example 2

A hollow-fiber membrane module 100 was manufactured by the same method as in Example 2 except that the hollow-fiber membrane of Reference Example 6 was used, and cross-flow filtration of the yeast culture fluid was performed, as a result, breakage of the hollow-fiber membrane and leakage of raw liquid into filtered liquid occurred.

Example 8

(Manufacture of Module)

The hollow fiber membrane of Reference Example 7 was immersed in an aqueous 30 mass % glycerin solution for 1 hour and then air-dried. A bundle of the hollow fiber membranes was sealed with a silicone adhesive (produced by Dow Corning Toray Co., Ltd., SH850A/B, a mixture of two components mixed to afford a mass ratio of 50:50) at one end.

On the surfaces of a polysulfone-made cylindrical case 3 (inside diameter: 50 mm, length: 500 mm) and a flow regulating cylinder 12, the region to which a potting agent is bonded was preliminarily filed with sandpaper (#80) and degreased with ethanol. Thereafter, as illustrated in FIG. 3, the hollow-fiber membrane bundle was packed inside of the cylindrical case 3 and the flow regulating cylinder 12. At this time, the filling ratio of the hollow-fiber membrane was set to be 41%, the hollow-fiber membrane bundle was disposed such that the end part on the sealed side faces a first end part (right-side end part of FIG. 3) of the cylindrical case 3, which is defining the module upper-part side, and a potting cap 14 was further attached. A potting cap 15 having 36 holes in the bottom thereof was attached to a second end part (left-side end part of FIG. 3) defining the module lower-part side. Then, 36 pins 13 were inserted into the holes in the bottom of the potting cap 15 and secured. The positions of the pins 13 were arranged in the same fashion as the through holes of FIG. 2, and a module having potting caps attached to both ends in this way was installed in a centrifugal molding machine.

A polymeric MDI (produced by Huntsman Japan Co., Ltd., Suprasec 5025), a polybutadiene-based polyol (produced by Cray Valley. Krasol LBH 3000), and 2-ethyl-1,3-hexanediol were mixed to afford a mass ratio of 57:100:26. The obtained mixture (i.e., polyurethane resin solution) was put in a potting agent charger 16.

Subsequently, the centrifugal molding machine was rotated, and each of the potting caps at both ends was filled with the potting agent to form a first potting part 4 and a second potting part 5. The potting agent charger 16 is split in two directions, and the polyurethane resin solution was charged into the module upper-part side (first end part) and the module lower-part side (second end part) due to centrifugal force. The temperature in the centrifugal molding machine was set to be 35° C., and the centrifugation time was set to be 4 hours.

After the centrifugation, the potting caps and pins were removed, and the potting agent was cured at room temperature for 24 hours. Thereafter, the potting agent portion (B-B plane depicted in FIG. 3) on the outer side of the module upper-part side (first end part side) of the polysulfone-made cylindrical case 3 was cut with a chip saw-type rotary blade to open the end face of the hollow-fiber membrane. An upper cap 6 and a lower cap 7 were then fixed to both ends of the polysulfone-made cylindrical case to obtain a hollow-fiber membrane module 100.

After that, ethanol was delivered to the hollow-fiber membrane module 100 and filtered to fill the pores of the hollow-fiber membrane with ethanol. Subsequently. RO water was delivered and filtered to replace ethanol with RO water.

(Filtration Test)

A budding yeast (*Saccharomyces cerevisiae* strain CM3260) was cultured at 30° C. for 24 hours in a liquid culture medium containing 20 g/L of glucose, 5 g/L of ammonium sulfate, 0.59 g/L of potassium chloride, 0.1 g/L of sodium chloride, 0.1 g/L of calcium chloride, 0.5 g/L of magnesium sulfate heptahydrate, 0.02 g/L of uracil, 0.06 g/L of leucine, 0.02 g/L of histidine, and 0.04 g/L of tryptophane.

The resulting yeast culture fluid was subjected to cross-flow filtration by the hollow-fiber membrane module 100. In the cross-flow filtration, the membrane surface linear velocity was set to be 2.5 m/s, and the filtration flux was set to be 1 $m^3/m^2/d$. Subsequently, backwashing with the filtered liquid was performed. The backwashing flux was set to be 2 $m^3/m^2/d$. The filtration time and backwashing time per cycle were set to be 29 minutes and 1 minute, respectively, and with a cycle consisting of cross-flow filtration and backwashing, 10 cycles were repeated. Denoting ΔP1 as the transmembrane pressure difference 1 minute after starting cross-flow filtration of the first cycle and ΔP2 as the transmembrane pressure difference 28 minutes after starting cross-flow filtration of the tenth cycle, the rising degree ΔP2/ΔP1 of transmembrane pressure difference was 2.7.

Example 9

A hollow-fiber membrane module 100 was manufactured by the same method as in Example 8 except that the filling ratio of the hollow-fiber membrane was changed to 60%, and cross-flow filtration of the yeast culture fluid was performed, as a result, the rising degree ΔP2/ΔP1 of transmembrane pressure difference was 2.4.

Example 10

A hollow-fiber membrane module 100 was manufactured by the same method as in Example 8 except that the filling ratio of the hollow-fiber membrane was changed to 75%, and cross-flow filtration of the yeast culture fluid was performed, as a result, the rising degree ΔP2/ΔP1 of transmembrane pressure difference was 2.1.

Example 11

A hollow-fiber membrane module 100 was manufactured by the same method as in Example 9 except that the hollow-fiber membrane of Reference Example 8 was used, and cross-flow filtration of the yeast culture fluid was performed, as a result, the rising degree ΔP2/ΔP1 of transmembrane pressure difference was 2.4.

Example 12

A hollow-fiber membrane module 100 was manufactured by the same method as in Example 9 except that the hollow-fiber membrane of Reference Example 9 was used, and cross-flow filtration of the yeast culture fluid was performed, as a result, the rising degree ΔP2/ΔP1 of transmembrane pressure difference was 2.5.

Example 13

A hollow-fiber membrane module 100 was manufactured by the same method as in Example 9 except that the hollow-fiber membrane of Reference Example 10 was used, and cross-flow filtration of the yeast culture fluid was performed, as a result, the rising degree ΔP2/ΔP1 of transmembrane pressure difference was 2.4.

Comparative Example 3

A hollow-fiber membrane module 100 was manufactured by the same method as in Example 8 except that the filling ratio of the hollow-fiber membrane was changed to 25%, and cross-flow filtration of the yeast culture fluid was performed, as a result, the rising degree ΔP2/ΔP1 of transmembrane pressure difference was 3.9, revealing early clogging of the hollow-fiber membrane.

Comparative Example 4

A hollow-fiber membrane module 100 was manufactured by the same method as in Example 9 except that the hollow-fiber membrane of Reference Example 11 was used, and cross-flow filtration of the yeast culture fluid was performed, as a result, breakage of the hollow-fiber membrane and leakage of raw liquid into filtered liquid occurred.

TABLE 1

| | Filling Ratio (%) | Breaking Strength of Membrane (MPa) | Raman Orientation Parameter ν | Maximum Raman Orientation Parameter M | Minimum Raman Orientation Parameter m | M/m | Orientation Degree π | Thickness Uniformity | Young's Modulus (GPa) | Pure-water Permeation Performance ($m^3/m^2/h$) | Rising Degree of Transmembrane Pressure Difference ΔP2/ΔP1 | Membrane Breakage |
|---|---|---|---|---|---|---|---|---|---|---|---|---|
| Example 1 | 40 | 26 | 1.82 | 2.31 | 1.32 | 1.8 | non-oriented | 0.51 | 0.26 | 1.0 | 2.5 | none |
| Example 2 | 60 | 26 | 1.82 | 2.31 | 1.32 | 1.8 | non-oriented | 0.51 | 0.26 | 1.0 | 2.2 | none |
| Example 3 | 75 | 26 | 1.82 | 2.31 | 1.32 | 1.8 | non-oriented | 0.51 | 0.26 | 1.0 | 2.0 | none |
| Example 4 | 60 | 35 | 2.53 | 3.08 | 1.14 | 2.7 | 0.31 | 0.62 | 0.24 | 1.6 | 2.2 | none |
| Example 5 | 60 | 29 | 2.96 | 3.31 | 1.42 | 2.3 | 0.34 | 0.70 | 0.35 | 2.2 | 2.1 | none |
| Example 6 | 60 | 27 | 2.13 | 2.69 | 1.65 | 1.6 | non-oriented | 0.66 | 0.28 | 0.7 | 2.2 | none |
| Example 7 | 60 | 26 | 2.35 | 2.84 | 1.21 | 2.4 | 0.25 | 0.60 | 0.22 | 2.0 | 2.1 | none |
| Comparative Example 1 | 25 | 26 | 1.82 | 2.31 | 1.32 | 1.8 | non-oriented | 0.51 | 0.26 | 1.0 | 3.4 | none |
| Comparative Example 2 | 60 | 11 | 1.01 | 1.03 | 1.00 | 1.0 | non-oriented | 0.39 | 0.16 | 1.0 | — | breakage occurred |

TABLE 2

| | Filling Ratio (%) | Breaking Strength of Membrane (MPa) | Orientation Degree π | Thickness Uniformity | Raman Orientation Parameter ν | Porosity of Hollow-Fiber Membrane (%) | Pure-water Permeation Performance ($m^3/m^2/h$) | Rising Degree of Transmembrane Pressure Difference ΔP2/ΔP1 | Membrane Breakage |
|---|---|---|---|---|---|---|---|---|---|
| Example 8 | 41 | 27 | 0.61 | 0.61 | 3.12 | 55 | 2.1 | 2.7 | none |
| Example 9 | 60 | 27 | 0.61 | 0.61 | 3.12 | 55 | 2.1 | 2.4 | none |
| Example 10 | 75 | 27 | 0.61 | 0.61 | 3.12 | 55 | 2.1 | 2.1 | none |
| Example 11 | 60 | 62 | 0.89 | 0.62 | 4.42 | 61 | 2.6 | 2.4 | none |
| Example 12 | 60 | 52 | 0.86 | 0.69 | 4.38 | 64 | 2.3 | 2.5 | none |
| Example 13 | 60 | 68 | 0.92 | 0.63 | 4.76 | 66 | 2.8 | 2 4 | none |
| Comparative Example 3 | 25 | 27 | 0.61 | 0.61 | 3.12 | 55 | 2.1 | 3.9 | none |
| Comparative Example 4 | 60 | 14 | non-oriented | 0.45 | 1.01 | 63 | 2.3 | — | breakage occurred |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-108318) filed on May 31, 2016 and Japanese Patent Application (Patent Application No. 2016-125527) filed on Jun. 24, 2016, the contents of which are incorporated herein by way of reference.

INDUSTRIAL APPLICABILITY

The hollow-fiber membrane module of the present invention can be used for water purification treatment, industrial water treatment, wastewater treatment, seawater desalination, and treatments of various liquids such as fermentation liquid, food and beverage.

DESCRIPTION OF REFERENCE NUMERALS AND SIGNS

100 Hollow-fiber membrane module
1 Hollow-fiber membrane
2 Hollow-fiber membrane bundle
3 Cylindrical case
4 First potting part
5 Second potting part
6 Upper cap
7 Lower cap
8 Raw liquid inflow port
9 Filtered liquid outlet
10 Raw liquid outlet
11 Through hole
12 Flow regulating cylinder
13 Pin
14 Potting cap (first end part)
15 Potting cap (second end part)
16 Potting agent charger
17 Columnar texture

The invention claimed is:

1. A hollow-fiber membrane module comprising:
a cylindrical case having a first end and a second end in a height direction,
a plurality of hollow-fiber membranes housed in the cylindrical case, and
a first potting part which bonds end parts of the plurality of hollow-fiber membranes located on the first end side of the cylindrical case while letting the end parts be open,
wherein the hollow-fiber membrane has a breaking strength of 23 MPa or more,
wherein a filling ratio of the hollow-fiber membrane is from 40 to 80%,
wherein the hollow-fiber membrane is a hollow-fiber membrane containing a fluororesin-based polymer,
wherein the hollow-fiber membrane has a columnar texture oriented in a longitudinal direction thereof,
wherein a molecular chain in the columnar texture is oriented in the longitudinal direction of the hollow-fiber membrane, and
wherein a Raman orientation parameter ν of the molecular chain is from 1.5 to 4.0:

$$\text{Raman orientation parameter} = (I1270/I840)\text{parallel}/(I1270/I840)\text{perpendicular} \quad (1)$$

wherein:
parallel condition: the longitudinal direction of the hollow-fiber membrane is parallel to a polarization direction;
perpendicular condition: the longitudinal direction of the hollow-fiber membrane is orthogonal to the polarization direction;
I1270 parallel: the intensity of Raman band at 1,270 $cm^{-1}$ under the parallel condition;
I1270 perpendicular: the intensity of Raman band at 1,270 $cm^{-1}$ under the perpendicular condition;
I840 parallel: the intensity of Raman band at 840 $cm^{-1}$ under the parallel condition; and
I840 perpendicular: the intensity of Raman band at 840 $cm^{-1}$ under the perpendicular condition.

2. The hollow-fiber membrane module according to claim 1, wherein the hollow-fiber membrane module is an external pressure-type hollow-fiber membrane module.

3. The hollow-fiber membrane module according to claim 1, wherein the columnar texture has a short-side length of from 0.5 to 3 μm and an aspect ratio of the columnar texture is 3 or more.

4. The hollow-fiber membrane module according to claim 1, wherein a thickness uniformity of the columnar texture is 0.50 or more.

5. A hollow-fiber membrane module comprising:
a cylindrical case having a first end and a second end in a height direction,
a plurality of hollow-fiber membranes housed in the cylindrical case, and
a first potting part which bonds end parts of the plurality of hollow-fiber membranes located on the first end side of the cylindrical case while the end parts being open,
wherein the hollow-fiber membrane has a breaking strength of 25 MPa or more, and a filling ratio of the hollow-fiber membrane is from 41 to 80%,
wherein the hollow-fiber membrane module is a hollow-fiber membrane containing a fluororesin-based polymer,
wherein the hollow-fiber membrane has a columnar texture oriented in a longitudinal direction thereof,
wherein at least a part of molecular chains of the fluororesin-based polymer are oriented in the longitudinal direction of the hollow-fiber membrane, and
wherein in the hollow-fiber membrane, an orientation degree π calculated based on the following formula (2) is 0.4 or more and less than 1.0:

$$\text{Orientation degree } \pi = (180° - H)/180° \quad (2)$$

wherein H is a half-width (°) of a diffraction intensity distribution in a circumferential direction of a wide-angle X-ray diffraction image.

6. The hollow-fiber membrane module according to claim 5, wherein the hollow-fiber membrane module is an external pressure-type hollow-fiber membrane module.

7. The hollow-fiber membrane module according to claim 5, wherein the columnar texture has a short-side length of from 0.5 to 3 μm and an aspect ratio of the columnar texture is 3 or more.

8. The hollow-fiber membrane module according to claim 5, wherein a thickness uniformity of the columnar texture is 0.60 or more.

9. The hollow-fiber membrane module according to claim 5, wherein the half-width H is a half-width of an intensity distribution obtained by circumferentially scanning a crystal peak (2θ=20.4°) derived from a (110) plane of polyvinylidene fluoride in the wide-angle X-ray diffraction measurement.

10. The hollow-fiber membrane module according to claim 5, wherein when wide-angle X-ray diffraction measurement is performed at measurement points at 1 cm intervals in the longitudinal direction of the hollow-fiber membrane, the orientation degree π is 0.4 or more and less than 1.0 at 80% or more of the measurement points.

* * * * *